(12) United States Patent
Tzeng et al.

(10) Patent No.: US 12,199,745 B2
(45) Date of Patent: Jan. 14, 2025

(54) TIME SYNCHRONIZATION BASED ON LOOKUP TABLE

(71) Applicant: Avago Technologies International Sales Pte. Limited, Singapore (SG)

(72) Inventors: Shrjie Tzeng, Cupertino, CA (US); Stephen Ho, San Marcos, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 416 days.

(21) Appl. No.: 17/587,542

(22) Filed: Jan. 28, 2022

(65) Prior Publication Data
US 2023/0246723 A1   Aug. 3, 2023

(51) Int. Cl.
H04J 3/06   (2006.01)

(52) U.S. Cl.
CPC .......... H04J 3/0667 (2013.01); H04J 3/0655 (2013.01); H04J 3/0697 (2013.01)

(58) Field of Classification Search
CPC ....... H04J 3/0667; H04J 3/0655; H04J 3/0697
See application file for complete search history.

(56) References Cited

U.S. PATENT DOCUMENTS

| | | | | |
|---|---|---|---|---|
| 7,057,539 B1 * | 6/2006 | Duewer | ............... | G01R 23/005 704/212 |
| 2009/0213733 A1 * | 8/2009 | Nallur | .................... | H04L 63/08 370/235 |
| 2011/0165865 A1 * | 7/2011 | Gao | ....................... | H04W 72/30 455/414.1 |
| 2012/0143819 A1 * | 6/2012 | Tan | .......................... | G06F 16/27 707/626 |
| 2012/0158990 A1 * | 6/2012 | Losio | .................... | H04J 3/0664 709/236 |
| 2013/0046732 A1 * | 2/2013 | Chueh | ................... | H04W 4/029 707/634 |
| 2013/0252557 A1 * | 9/2013 | Hillyard | ................ | H04W 4/80 455/41.2 |
| 2014/0177653 A1 | 6/2014 | Tzeng | | |
| 2015/0067129 A1 * | 3/2015 | Hayashi | .............. | H04L 12/1827 709/223 |
| 2015/0371011 A1 * | 12/2015 | Miki | ...................... | H04N 7/152 726/28 |
| 2018/0295011 A1 * | 10/2018 | Wang | .................. | H04L 41/0833 |
| 2018/0359654 A1 * | 12/2018 | McDonald | .............. | H04W 4/08 |

* cited by examiner

Primary Examiner — Bailor C Hsu
(74) Attorney, Agent, or Firm — Foley & Lardner LLP

(57) ABSTRACT

Described herein are systems and methods for implementing a look up table by a network node, and performing or supporting time synchronization based on the look up table. In one aspect, a network node may receive a packet. The network node can identify a few number of bits in the packet, and determine one or more actions or functions corresponding to the few number of bits via the look up table. In addition, the network node can execute or perform the determined one or more actions to support time synchronization.

20 Claims, 9 Drawing Sheets

TIME SYNCHRONIZATION BASED ON LOOKUP TABLE

FIELD OF THE DISCLOSURE

This disclosure generally relates to systems and methods for synchronization between network nodes.

BACKGROUND

Timing and frequency synchronization among network nodes that communicate with each other is an important issue in network performance. The accuracy of the synchronization between network nodes affects the performance of systems attached to the network and also the overall performance of the network. The IEEE 1588 protocol, referred to as the Precision Time Protocol (PTP) is a technique for providing robust cost-effective time synchronization for the distributed systems. IEEE 1588 is designed for substantially higher accuracy levels (e.g., on the order of sub-microseconds) than other network synchronization protocol such as the Network Time Protocol (NTP).

IEEE 1588 is based on packet exchanges between network nodes such as masters and as slaves (also referred to as master nodes and slave nodes, respectively). Each slave may synchronize its clock ("slave clock" or SC) to the clock of a master. To enhance fault tolerance, an election process may determine one among a plurality of masters to provide the accurate clock at any particular instant to the slaves. The master that is selected to provide the accurate clock is referred to as a grandmaster or GM.

To synchronized time, participating network nodes may generate or obtain accurate timestamps of selected packet ingress and/or egress, and exchange the timestamps among different network nodes. In one example, a time difference between when a packet is transmitted from a first node and when that packet is received at a second node can be determined, according to timestamps. Based on the time difference, slave nodes can adjust its clock to synchronize with the clock of the master.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes. IEEE 1588. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of synchronization based on lookup table.

A. Computing and Network Environment

Figure 1A:
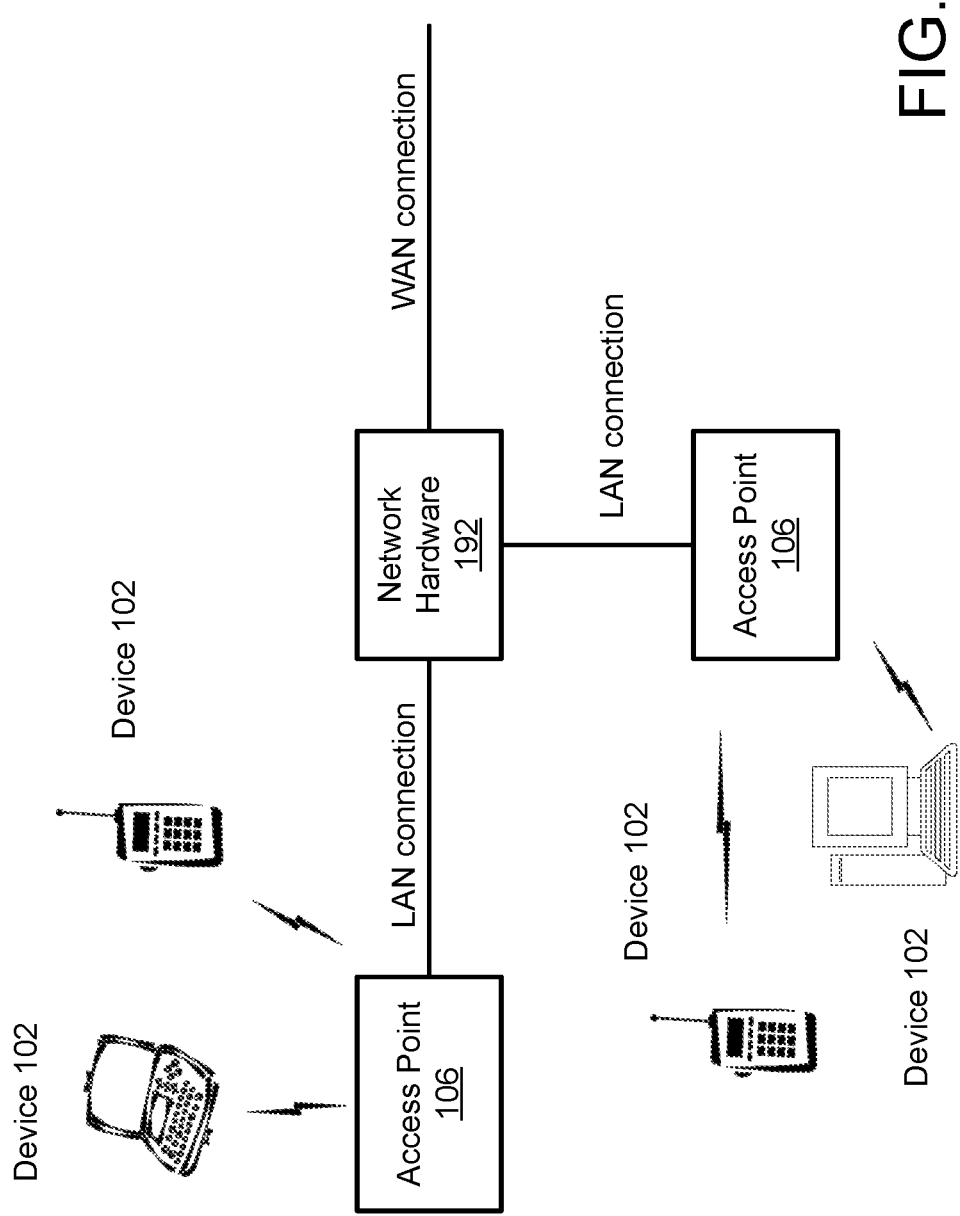
FIG. 1A is a block diagram depicting a network environment including one or more access points in communication with one or more devices or stations, according to some embodiments.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102, and/or cellular telephone devices 102. The details of an embodiment of each wireless communication device 102 and/or AP 106 are described in greater detail with reference to FIGS. 1B and 1C. The network environment can be an ad hoc network environment, an infrastructure wireless network environment, a subnet environment, etc., in one embodiment. The APs 106 can be operably coupled to the network hardware 192 via local area network connections. The network hardware 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices 102 can register with a particular AP 106 to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to AP 106.

In some embodiments an AP 106 includes a device or module (including a combination of hardware and software) that allows wireless communication devices 102 to connect to a wired network using wireless-fidelity (WiFi), or other standards. An AP 106 can sometimes be referred to as a wireless access point (WAP). An AP 106 can be implemented (e.g., configured, designed and/or built) for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provide wireless connections using radio frequency links for other devices 102 to utilize that wired connection. An AP 106 can be implemented to support a standard for sending and receiving data using one or more radio frequencies. Those standards, and the frequencies they use can be defined by the IEEE (e.g., IEEE 802.11 standards). An AP 106 can be configured and/or used to support public Internet hotspots, and/or on a network to extend the network's Wi-Fi signal range.

In some embodiments, the access points 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points 106.

The network connections can include any type and/or form of network and can include any of the following: a point-to-point network, a broadcast network, a telecommunications network, a data communication network, and a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
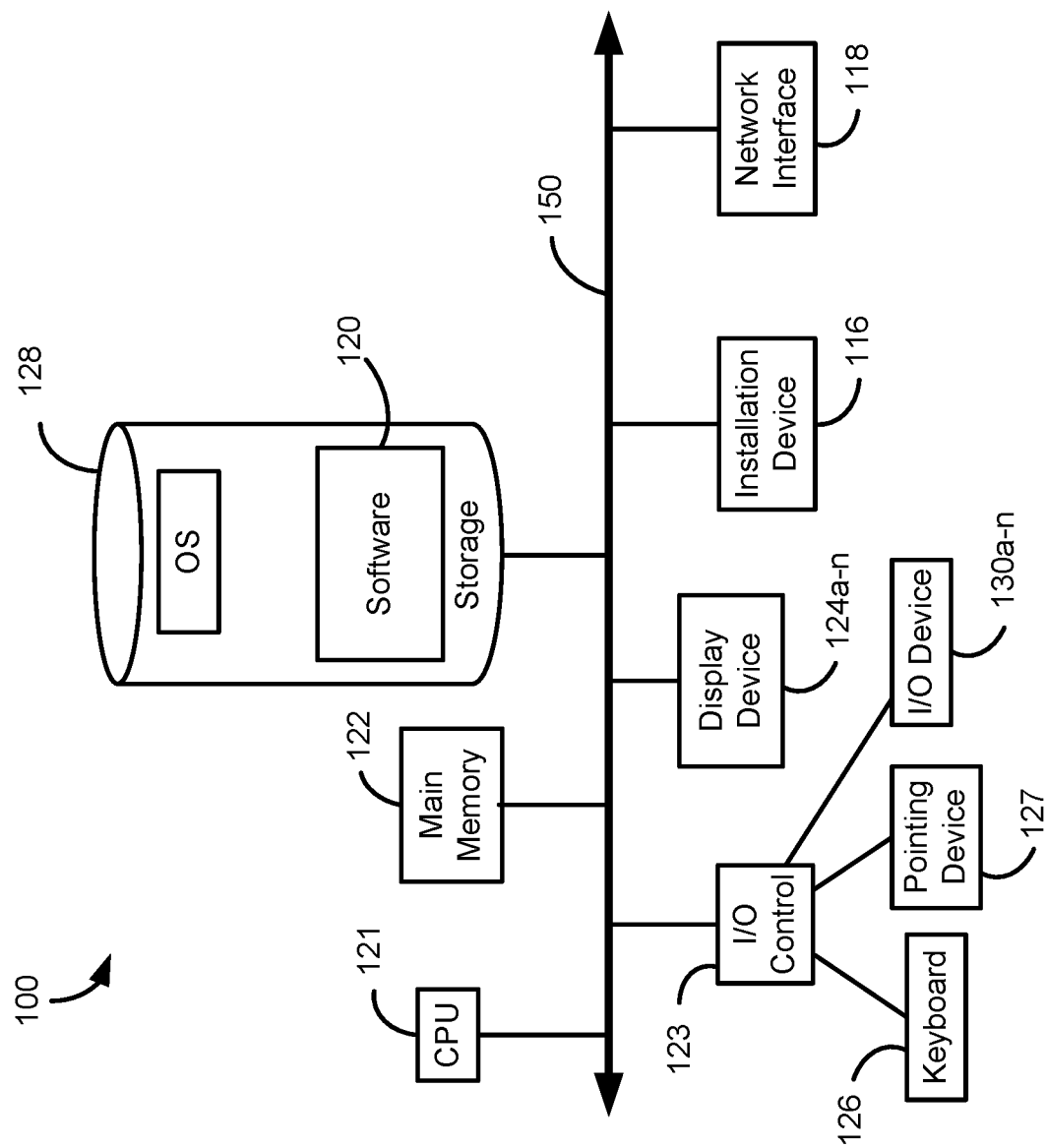
FIGS. 1B and 1C are block diagrams depicting computing devices useful in connection with the methods and systems described herein, according to some embodiments.
Figure 1C:
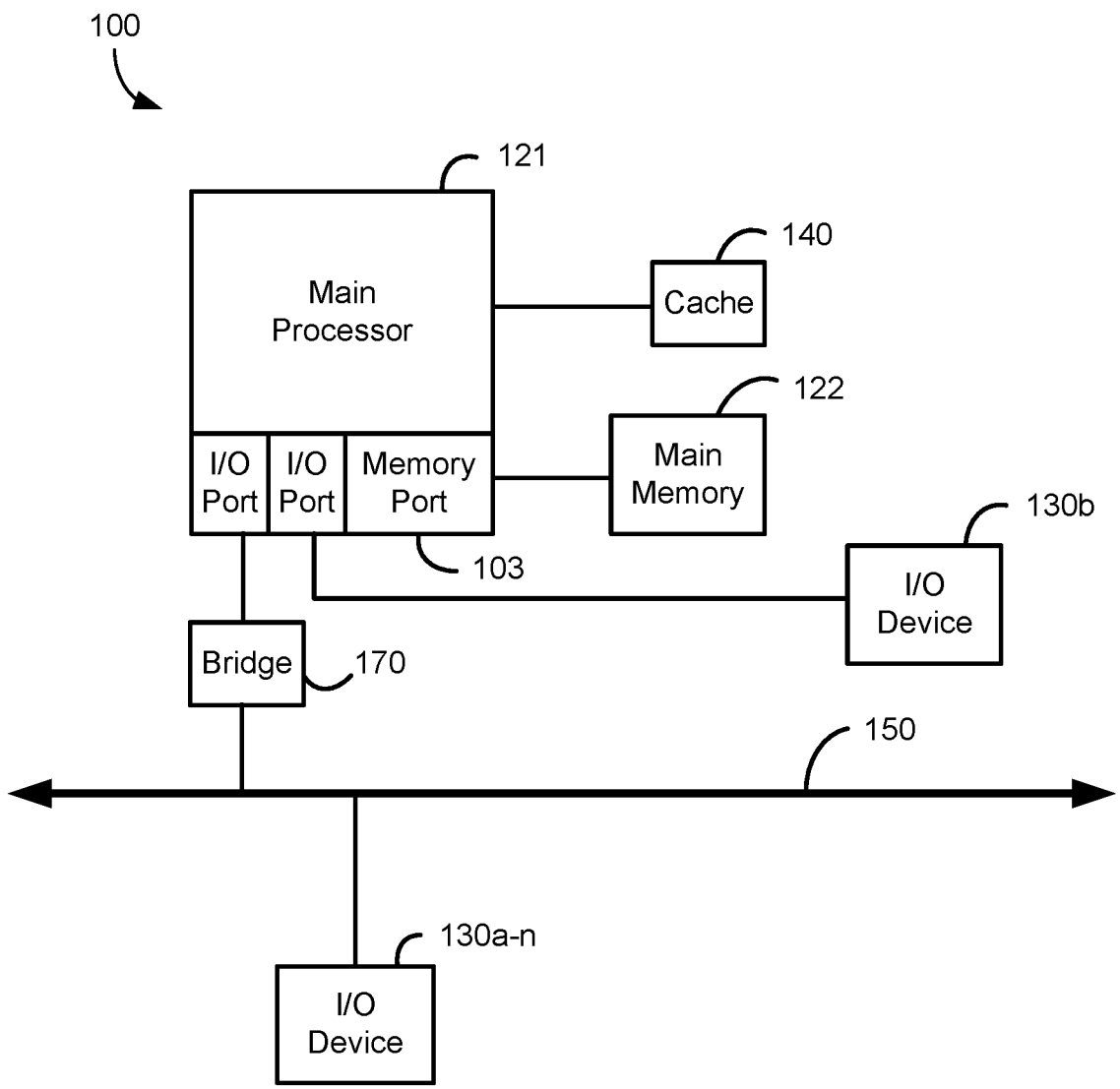

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or AP 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126, and a pointing device 127 such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Synchronization Based on Lookup Table.

Described herein are systems and methods for implementing a look up table by a network node, and performing or supporting time synchronization based on the look up table. In one aspect, a network node may receive a packet. The network node can identify a few number of bits in the packet, and determine one or more actions or functions corresponding to the few number of bits via the look up table. In addition, the network node can execute or perform the determined one or more actions to support time synchronization.

Advantageously, the look up table as disclosed herein allows various actions to perform or support time synchronization among different nodes, according to the PTP message types. For example, IEEE 1588 2.0 allows reserved fields 0-1 including 12 bits for exchanging or providing instructions or commands to execute various actions, but IEEE 1588 2.1 no longer allows a reserved field 0-1 for exchanging or providing such instructions or commands. In one aspect, one or more actions supported in IEEE 1588 2.0 can be performed while conforming to IEEE 1588 2.1 using the on-chip lookup table. Moreover, different actions or more efficient actions than the actions supported in IEEE 1588 2.0 can be performed.

Figure 2:
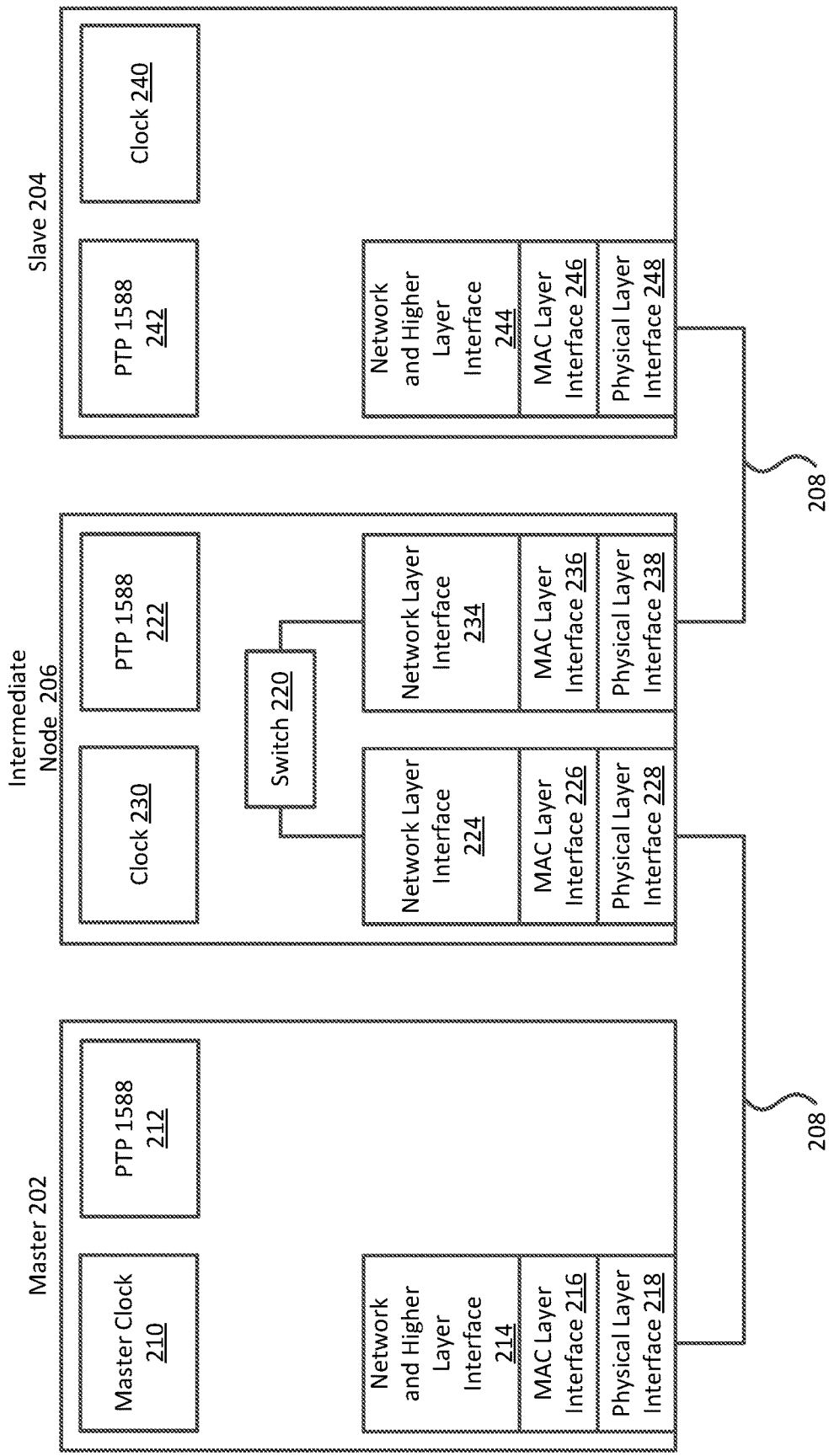
FIG. 2 illustrates a system for synchronizing time between network nodes, in accordance with an embodiment.

FIG. 2 illustrates a system 200 for synchronizing time between network nodes, in accordance with an embodiment. In some embodiments, the system 200 includes a master 202, slave 204, and intermediate node (e.g. network switch) 206 which interconnects the master 202 and the slave 204. Each of the master 202, the slave 204, and the intermediate node 206 may be the device 102, the access point 106, the network hardware 192, or any communication device.

The master 202 provides the clock to which the slave 204, and, in some embodiments, intermediate node 206 synchronizes. The master clock 210 may be based upon a global positioning system (GPS) clock or other accurate clock. The master 202 may include, for example, a GPS receiver (not shown) and GPS clock adjust circuitry (not shown) which may be used by the master 202 to keep the master clock 210 in synchronization with a highly accurate external GPS clock. The master 202 may include one or more computers, such as a server computer or cluster of server computers. The master 202 is communicatively coupled to the slave 204 and one or more intermediate nodes 206 over a network 208. The network 208 may be a wired network (e.g., Ethernet) or a wireless network (e.g., Wi-Fi, cellular network, Bluetooth, etc.).

In some embodiments, the master 202 includes interfaces including a physical layer interface 218, a media access control (MAC) layer interface 216, and a network layer and above interface 214. In some embodiments, the master 202 also includes an IEEE 1588 protocol processor 212. Each of the components 212, 214, 216, 218 can be implemented in software, firmware, hardware or a combination thereof.

In some embodiments, the IEEE 1588 protocol processor 212 operates to provide the generation and processing of messages, and maintaining of state related to PTP at the master 202. The IEEE 1588 protocol processor 212 may include functions, such as timestamping and/or classification, implemented in the hardware in the physical interface and other functions implemented in software.

In some embodiments, the network and higher layer interface 214 is a component that processes internet protocol (IP) and higher layer (e.g. transport layer) communication, routing and forwarding. The MAC layer interface 216 is a component that processes layer 2 packet headers and protocols. The physical layer interface 218 is a component that processes layer 1 protocol aspects and receipt/transmission of packets from/to the network media. The IEEE 1588 protocol processor 212, the network and higher layer interface 214, the MAC layer interface 216, and the physical layer interface 218 may operate in combination to perform operations described in relations to the master 202 described herein.

In some embodiments, the slave 204 includes interfaces including a physical layer interface 248, a media access control (MAC) layer interface 246, and a network layer and higher layer interface 244. The slave 204 also includes an IEEE 1588 protocol processor 242. Each of the components 242, 244, 246, 248 can be implemented in software, firmware, hardware or a combination thereof.

In some embodiments, the IEEE 1588 protocol processor 242 performs the generation and processing of messages, and maintaining of state related to PTP at slave 204. The IEEE 1588 protocol processor 242 may include functions, such as timestamping and/or classification, implemented in the hardware in the physical interface and other functions implemented in software. The IEEE 1588 protocol processor 242 may operate to maintain synchronization of slave clock 240 with a master clock, such as master clock 210.

In some embodiments, the network layer and higher layer interface 244 is a component that processes internet protocol (IP) and higher layer (e.g. transport layer), routing and forwarding. The MAC layer interface 246 is a component that processes layer 2 packet headers and protocols. The physical layer interface 248 is a component that processes layer 1 protocol aspects and receipt/transmission of packets from/to the network media. The IEEE 1588 protocol processor 242, the network and higher layer interface 244, the MAC layer interface 246, and the physical layer interface 248 may operate in combination to perform operations described in relations to the slave 204 described herein.

In some embodiments, the intermediate node 206 includes interfaces including physical layer interfaces 228, 238, media access control (MAC) layer interfaces 226, 236, and network layer and higher layer interfaces 224, 234. In some embodiments, the intermediate node 206 includes a switch 220 that operates to route/switch incoming packets to an outgoing interface. For example, packets from the master 202 to the slave 204 are received on a first physical layer interface 228 and switched using the switch 220 to a second physical layer interface 238 through which the packet is transmitted to the slave 204. In some embodiments, the intermediate node 206 also includes an IEEE 1588 protocol processor 222. Each of the components 220, 222, 224, 226, 228, 234, 236, and 238 can be implemented in software, firmware, hardware or a combination thereof.

In some embodiments, the IEEE 1588 protocol processor 222 is a component that determines the residence time of PTP packets and updates timestamps at the intermediate node 206. The IEEE 1588 protocol processor 222 may include functions, such as timestamping and/or classification, implemented in the hardware in the physical layer (e.g. PHY) and other functions implemented in software. Note that where the intermediate node 206 can be a master and/or slave, the IEEE 1588 protocol processor 222 can also perform operations of the IEEE 1588 protocol processor 212 and/or IEEE 1588 protocol processor 242 (e.g., generating and processing of messages, and maintaining of state related to PTP, etc.).

In some embodiments, the network and higher layer interfaces 224, 234 include or perform operations to process internet protocol (IP) and higher layer (e.g. transport layer), and routing and forwarding. In some embodiments, the MAC layer interfaces 226, 236 include or perform operations to process layer 2 packet headers and protocols. In some embodiments, the physical layer interfaces 228, 238 include or perform operations to process layer 1 protocol aspects and receipt/transmission of packets from/to the network media. The IEEE 1588 protocol processor 222, the network and higher layer interfaces 224, 234, the MAC layer interfaces 226, 236, and the physical layer interfaces 228, 238 and the switch 220 may operate in combination to perform operations described in relations to the intermediate node 206 described herein.

Figure 3A:
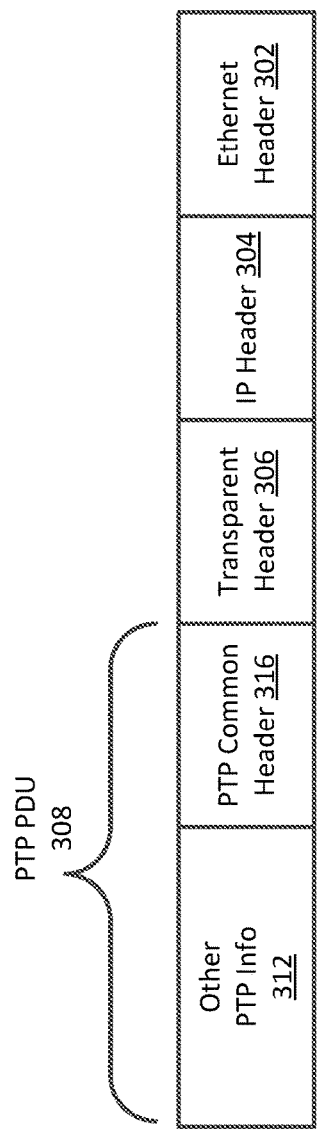
FIG. 3A illustrates format of a Precision Time Protocol (PTP) packet described in IEEE 1588, in accordance with an embodiment.

FIG. 3A illustrates a format for a Precision Time Protocol (PTP) packet 300 conforming to an IEEE 1588 protocol, in accordance with an embodiment. The packet 300 illustrates a sequence of headers of the different protocol layers that are attached to the payload of PTP data 312. The PTP may be located above the transport layer (e.g. user datagram protocol (UDP)) of the Open Systems Interconnect (OSI) protocol stack. The PTP data 312 may include a message format for each type of PTP message such as, but not limited to, SYNC, SYNC_FOLLOWUP, DELAY_REQ and DELAY_RSP.

The PTP data 312, for any type of PTP message, is preceded by a PTP common header 316. The format of the common header 316 is described in relation to FIG. 3B. The PTP data 312 and the common header 316 may form a PTP protocol data unit (PDU) 308. The PTP PDU 308 may be processed by the respective PTP protocol processor (e.g. 212, 222, and 242 described above) in master 202, slave 204, intermediate node 206 or any network node participating in the IEEE 1588 synchronization.

The PTP PDU 308 is preceded by a transport protocol header 306. The transport protocol header 306 may indicate port level information for protocol processing of packets. In IEEE 1588, the transport protocol header 306 may include a user datagram protocol (UDP) header.

The transport protocol header 306, is preceded by a network protocol header 304 (also referred to as "an IP header 304") and a MAC layer header 302 (also referred to as "an Ethernet header 302").

Figure 3B:
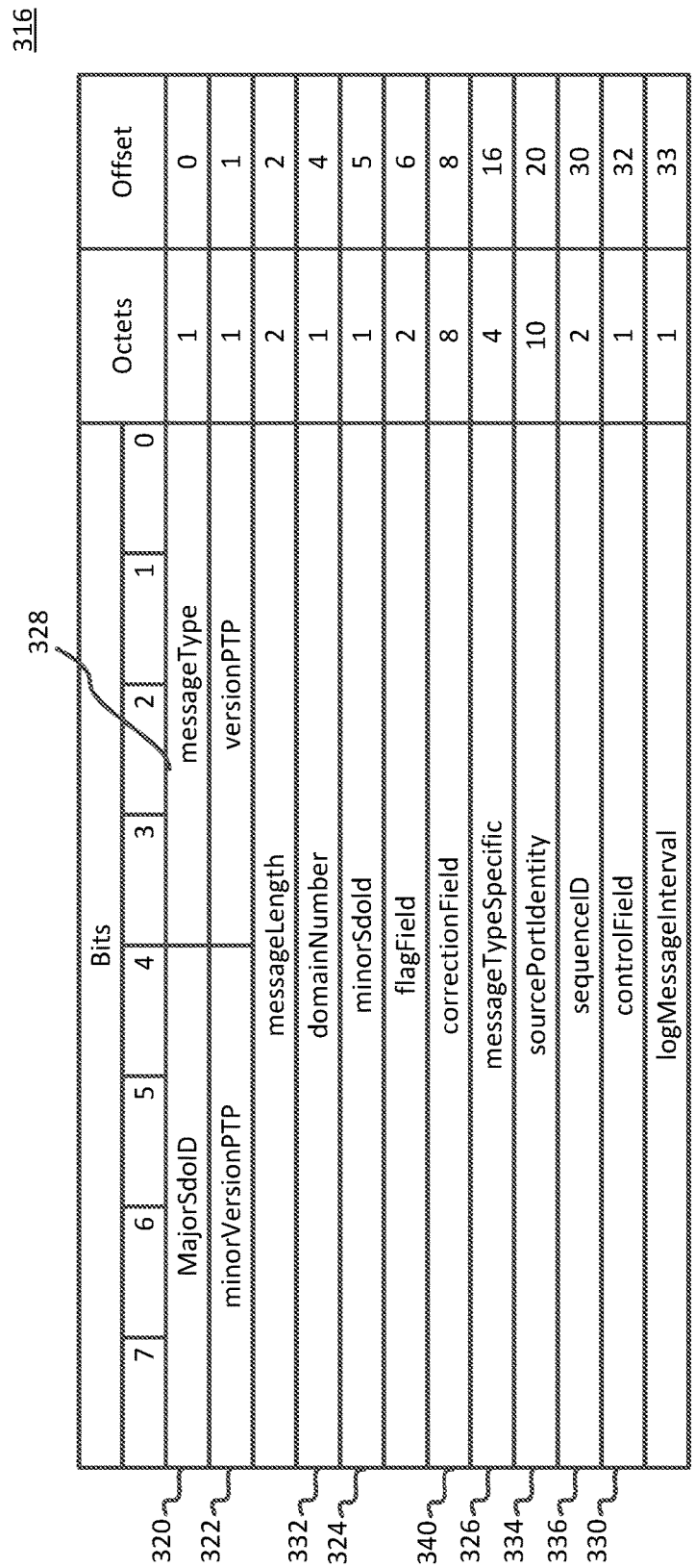
FIG. 3B illustrates format of a common header of a PTP packet, in accordance with an embodiment.

FIG. 3B illustrates a format of the common header 316 of the PTP packet 300, in accordance with an embodiment. Common header 316, for example, is attached to each PTP message in accordance with IEEE 1588 2.1.

According to IEEE 1588 2.1, the common header 316 includes a messageType field 328 and controlField 330. The MessageType field 328 indicates the type of PTP message, and the controlField 330 indicates a particular operation. The common header 316 also includes a domainNumber field 332, a sourcePortIdentity field 334 and a sequenceIdentifier field 336. The domainNumber field 332 identifies a unique synchronization domain. The sourcePortidentity 334 uniquely identifies a source port. The sequenceIdentifier 336 identifies the cycle of synchronization message exchange. The common header 316 also includes a correctionField 340. The correction field 340 includes the residence times determined by the intermediate nodes.

According to IEEE 1588 2.1, the common header 316 includes a minorVersionPTP field 322, a majorSdold field 320, minorSdold field 324, and a reserved field 326. The minorVersionPTP field 322 may include four bits to indicate a minor version number of IEEE 1588 PTP. The majorSdold field 320 may include 4 bits of most significant bits of a domain identification, where the minorSdold field 324 may include 8 bits of least significant bits of the domain identification. The use of the reserved field 326 is not defined in IEEE 1588 2.1.

In one aspect, fields in the common header 316 conforming to IEEE 1588 2.0 corresponding to the fields 322, 324 are also reserved fields. Hence, according to IEEE 1588 2.0, various instructions or commands can be exchanged through those fields corresponding to the fields 322, 324. However, according to IEEE 1588 2.1, the fields 322, 324 are no longer reserved fields, and such instructions or commands conforming to IEEE 1588 2.0 may not be provided through the fields 322, 324.

Figure 4:
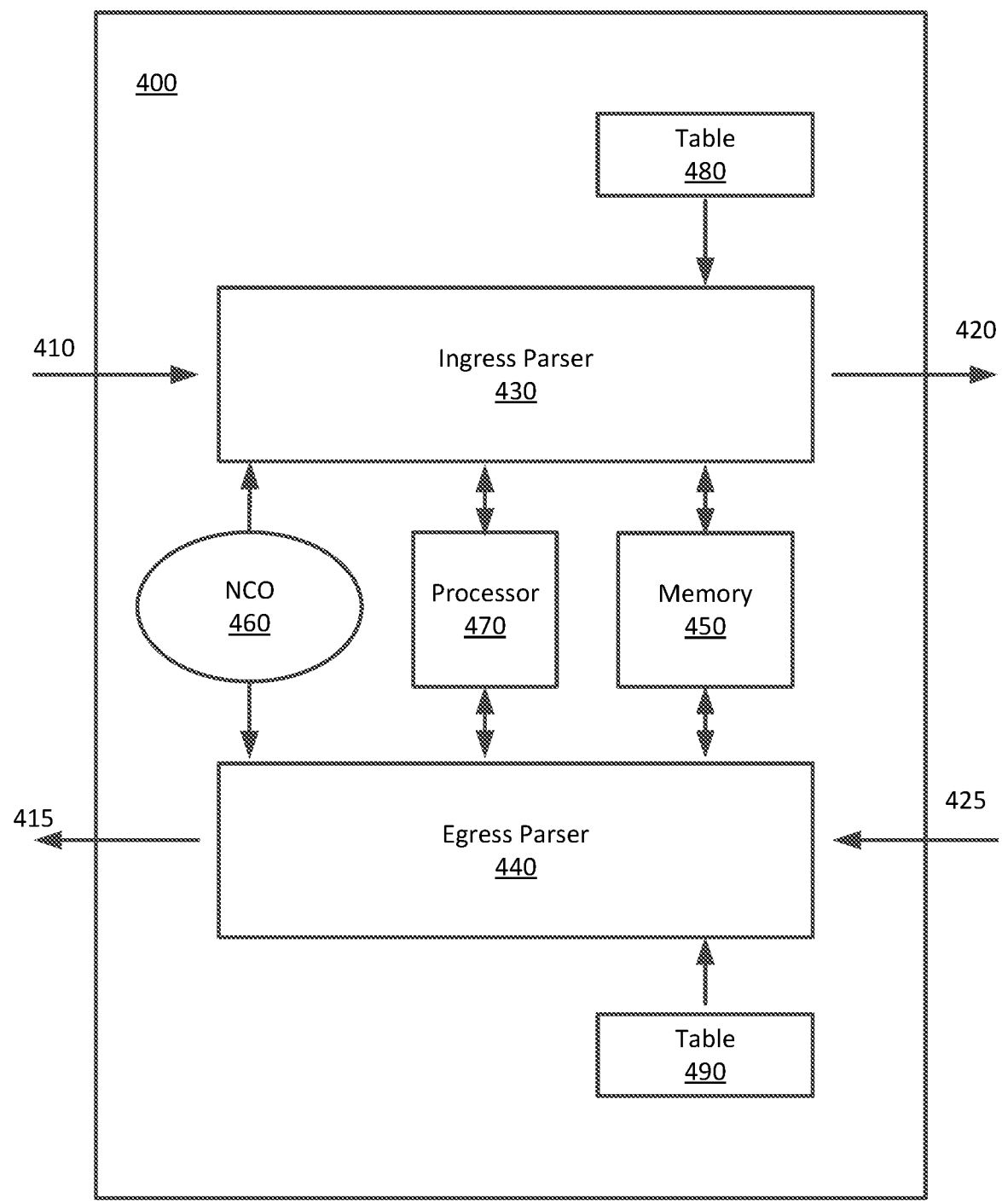
FIG. 4 illustrates a block diagram of a network device to perform synchronization based on a look up table, in accordance with an embodiment.

FIG. 4 illustrates a block diagram of a network device 400 to perform synchronization based on one or more look up tables 480, 490, in accordance with an embodiment. The network device 400 can be the master 202, the intermediate node 206, or the slave 204. In some embodiments, the network device 400 includes an ingress parser 430, an egress parser 440, memory device 450, controllable oscillator (NCO) 460, a processor 470, and one or more storage components storing the tables 480, 490. These components may operate together to perform synchronization operations based on the tables 480, 490. In some embodiments, the network device 400 includes more, fewer, or different components than shown in FIG. 4.

The ingress parser 430 is a communication interface (or network interface) component that receives an ingress packet 410, and processes or parses the ingress packet 410 to perform one or more actions according to the ingress packet 410. In some embodiments, the ingress parser 430 includes a processing device (or processor) and a non-transitory computer readable storage medium, where the processing device receives one or more instructions from the non-transitory computer readable medium, and executes the one or more instructions to perform various functions of the ingress parser 430 described herein. The packet 410 may have formats as described with respect to FIGS. 3A and 3B. In one approach, the ingress parser 430 identifies one or more bits in a predetermine field (e.g., reserved field 326) of the ingress packet 410, and applies the one or more identified bits to the table 480 to determine a corresponding action. For example, the ingress parser 430 may cause the memory 450 to store a timestamp value, or read the stored timestamp value. For example, the ingress parser 430 may provide an instruction or command to the processor 470 to execute. The ingress parser 430 may generate an ingress packet 420 and transmit the ingress packet to another network device. The ingress packet 420 may be the same as the ingress packet 410, or may be modified from the ingress packet 410.

The egress parser 440 is a communication interface (or network interface) component that receives an egress packet 425, and processes or parses the egress packet 425 to perform one or more actions according to the egress packet 425. In some embodiments, the egress parser 440 includes a processing device and a non-transitory computer readable medium, where the processing device receives one or more instructions from the non-transitory computer readable medium, and executes the one or more instructions to perform various functions of the egress parser 440 described herein. The packet 425 may have formats as described with respect to FIGS. 3A and 3B. In one approach, the egress parser 440 identifies one or more bits in a predetermine field (e.g., reserved field 326) of the egress packet 425, and applies the identified one or more bits to the table 490 to determine a corresponding action. For example, the egress parser 440 may cause the memory 450 to store a timestamp value, or read the stored timestamp value. For example, the egress parser 440 may provide an instruction or command to the processor 470 to execute. The egress parser 440 may generate an egress packet 415 and transmit the egress packet 415 to another network device. The egress packet 415 may be the same as the egress packet 425, or may be modified from the egress packet 425.

The memory 450 is a storage component that stores one or more timestamp values from the ingress parser 430 and the egress parser 440. The memory 450 may store a start of packet timestamp value of the ingress packet 410, according to an instruction or command requesting to store the timestamp value from the ingress parser 430. The memory 450 may also store a start of packet timestamp value of the egress packet 425, according to an instruction or command requesting to store the timestamp value from the egress parser 440. The memory 450 may also receive an instruction or command requesting a timestamp value from the ingress parser 430, the egress parser 440, or the processor 470 and provide the requested timestamp value in response to such instruction or command.

The NCO 460 is a controllable clock. In some embodiments, the NCO 460 can output a time value of the clock to the ingress parser 430, the egress parser 440 or the processor 470. In some embodiments, the clock can be adjusted, according to an instruction or commands requesting to update the clock from the ingress parser 430, the egress parser 440 or the processor 470.

The processor 470 is a component that receives one or more instructions from a non-transitory computer readable medium of the device 400, and executes the one or more instructions to control operations of the ingress parser 430, the egress parser 440 or other components of the device 400. In some embodiments, the processor 470 can execute and perform one or more functions of the ingress parser 430 or the egress parser 440. In some embodiments, the ingress parser 430 and/or the egress parser 440 can execute and perform one or more functions of the processor 470, such that the time synchronization can be performed promptly.

The table 480 is stored by a storage component of the device 400. The storage components can be a SRAM or any storage component. The table 480 may include a list of one or more actions that the ingress parser 430 can perform. For example, the ingress parser 430 can apply one or more bits in a reserved field to the table 480 to determine a corresponding action to perform. In one aspect, the table 480 can store a list of one or more actions for a particular role (e.g., master 202, intermediate node 206, or the slave 204) of the network device 400. According to the assigned role, the processor 470 may retrieve, from a set of actions, a subset of actions associated with the assigned role. Hence, the table 480 can store a number of actions corresponding to a few number of bits in the ingress packet 410 for the role of the device 400.

The table 490 is stored by a storage component of the device 400. The storage components can be a SRAM or any storage component. The table 490 may include a list of one or more actions that the egress parser 440 can perform. For example, the egress parser 440 can apply one or more bits in a reserved field to the table 490 to determine a corresponding action to perform. In one aspect, the table 490 can store a list of one or more actions for a particular role (e.g., master 202, intermediate node 206, or the slave 204) of the network device 400. According to the assigned role, the processor 470 may retrieve, from a set of actions, a subset of actions associated with the assigned role. Hence, the table 490 can store a number of actions corresponding to a few number of bits in the egress packet 425 for the role of the device 400.

Figure 5:
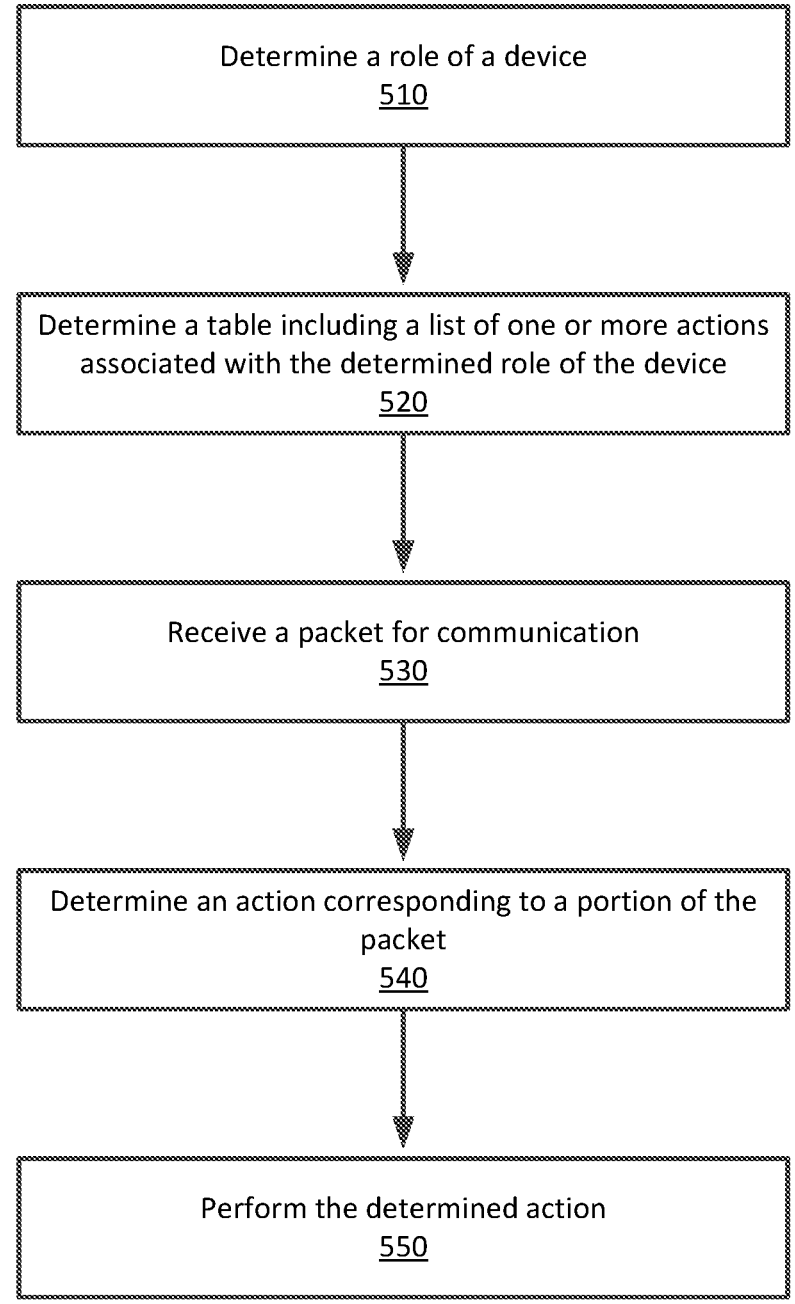
FIG. 5 illustrates a flow chart showing a process of a network device performing synchronization based on a look up table, in accordance with an embodiment.

FIG. 5 illustrates a flow chart showing a process 500 of the network device 400 performing synchronization based on a look up table (e.g., table 480 or 490), in accordance with an embodiment. In some embodiments, the process 500 can be performed by the processor 470, the ingress parser 430, the egress parser 440, or any combination of them. In some embodiments, the process 500 can be performed by a different entity. In some embodiments, the process 500 includes more, fewer, or different steps than shown in FIG. 5.

In one approach, the processor 470 determines 510 a role of a device 400. The processor 470 may present a user interface allowing a user of the device to select or specify a role of the device 400. For example, the device can be a master 202, intermediate node 206, or the slave 204. In one aspect, the user may select or specify an operating mode of the device. For example, the device 400 may operate in a mode to support a specific capability (e.g., end-to-end delay request-response TC without partial TC, end-to-end delay request-response TC with partial TC mode, and a peer-2-peer/802.1AS TC). The role of the device 400 can be determined before deploying the device 400, or while the device 400 is in operation. In some embodiments, the ingress parser 430 or the egress parser 440 may perform the step 510.

In one approach, the processor 470 determines 520 a table including a list of one or more actions associated with the determined role and/or the operating mode of the device 400. For example, the processor 470 may determine one or more actions for an ingress parser 430 for the selected role and/or operating mode, and load the table 480 with the determined one or more actions. Similarly, the processor 470 may determine one or more actions for an egress parser 440 for the selected role and/or operating mode, and load the table 490 with the determined one or more actions. In some embodiments, the ingress parser 430 or the egress parser 440 may perform the step 520.

In one approach, a communication interface receives 530 a packet for communication. The communication interface may be the ingress parser 430 or the egress parser 440. For example, the ingress parser 430 of a master 202 receives an ingress packet 410 from an egress parser 440 of an intermediate node 206 or a slave 204. For example, the ingress parser 430 of an intermediate node 206 or a slave 204 receives an ingress packet 410 from an egress parser 440 of a master 202. For example, the egress parser 440 of a master 202 or a slave 204 receives an egress packet 425 from a local switch or host processor or an external processor. For example, the egress parser 440 of an intermediate node 206 receives an egress packet 425 from an egress parser 440 of a master 202 or a slave 204. In some embodiments, the processor 470 detects a type of packet, and determines a table of one or more actions according to the determined type of packet as well as the role and/or the operating mode of the device 400.

In one approach, the communication interface determines 540 an action corresponding to a portion of the packet. For example, the communication interface obtains one or more bits in a predetermined field (e.g., reserved field 326). The communication interface may apply the obtained one or more bits to a corresponding table (e.g., table 480 or 490), and determine or identify one or more actions corresponding to the one or more bits.

In one approach, the communication interface performs 550 the determined action. For example, the communication interface may add a timestamp value to a packet, or store a timestamp value by the memory 450, according to the table (e.g., table 480 or 490).

Advantageously, the look up table as disclosed herein allows various actions to perform or support time synchronization among different nodes, according to the PTP message types. For example, IEEE 1588 2.0 allows reserved fields 0-1 including 12 bits for exchanging or providing instructions or commands to execute various actions, but IEEE 1588 2.1 no longer allows a reserved field 0-1 for exchanging or providing such instructions or commands. In one aspect, one or more actions supported in IEEE 1588 2.0 can be performed while conforming to IEEE 1588 2.1 using the on-chip lookup table. Moreover, different actions or more efficient actions than the actions supported in IEEE 1588 2.0 can be performed.

Example Roles and Operating Modes

In some embodiments, the device 400 can be configured to operate as various roles of a 1588 system. For example, the device 400 can be a TC (or an intermediate node 206), a SC (or slave 204), or a GM (or master 202). In one approach, a user of the device 400 may assign the device 400 to operate as a particular role. For example, the processor 470 present a user interface allowing the user to select or specify a particular role of the device 400. In one aspect, in addition to a role of the device 400, an operating mode of the device 400 can be assigned. For example, when acting as a TC, the device 400 may support end-to-end delay request-response TC without partial TC mode, end-to-end delay request-response TC with partial TC mode, and a peer-2-peer/802.1AS TC mode.

TABLE 1

Configurable role and mode of network device

| Predefined role | GM | SC | TC | Partial TC enable | 802.1 AS mode |
|---|---|---|---|---|---|
| Master dock E2E and P2P | 1 | 0 | 0 | X | X |
| Slave Clock E2E and P2P | 0 | 1 | 0 | X | X |
| E2E delay request response TC, no partial TC | 0 | 0 | 1 | 0 | 0 |
| E2E delay request response TC, with particular TC | 0 | 0 | 1 | 1 | 0 |
| P2P 802.1AS TC | 0 | 0 | 1 | X | 0 |

When acting as a GM or SC, the device 400 can support both peer-2-peer/802.1AS mode and end-2-end delay request-response mode simultaneously. Therefore, peer-2-peer 802.1 AS mode and end-2-end delay request-response mode may not be set for GM or SC.

Ingress/Egress 1588 Packet Classifier

In one aspect, the ingress parser 430 or the egress parser 440 includes or is coupled to a packet classifier to classify each incoming/outgoing packet to which type of packet it is. A list of available packet type is provided below.

TABLE 2

Available packet type support packets packetIsSyncOneStep
packetIsSyncTwoStep
packetIsDelayRequest
packetIsSyncFollowUp
packetIsPdelayRequest
packetIsPdelayResponseOneStep
packetIsPdelayResponseTwoStep
packetIsPdelayRespFollowUp
packetIsDelayResponse
not 1588 packet In one implementation, event messages or packets may be identified, since event messages (Sync, DelayRequest, PdelayRequest, and Pdelay_Response) are the timing critical message and these messages may cause hardware to perform timestamping to achieve high 1588 accuracy. With the lookup-based engine, messages or packets can be classified or categorized for non-event messages. For example, the parser can identify non-event message types (SyncFollowUp, PdelayRespFollowUp, and DelayResponse). Accordingly, the communication interface (e.g., ingress parser 430 or the egress parser 440) can perform various actions on non-event messages. By classifying non-event message types, the parsers may process these messages or packet, without the processor 470 performing MDIO access to construct the corresponding messages. By obviating MDIO access, the speed of the device 400 can be improved.

Ingress Action Table

For each ingress message type that identified by the packet classifier, various actions can be assigned. Below is a list of actions supported on the ingress side.

TABLE 3

Allowable actions for ingress parser

| Action | RTL Code Parameter | 1588 Version |
|---|---|---|
| pop TS from memory into OTS | POP_TS_INSERT_OTS | ver 2.0 |
| insert RXTS into RSV2 (new) | INSERT_RSV2 | ver 2.1 |
| push TS to memory | PUSH_TS_memory | ver 2.0 |
| CF = CF − RXTS(new) | SUB_TS_CF | ver 2.1 |
| insert TS into OTS | INSERT_TS_OTS | ver 2.0 |
| pop TS from memory into RSV2(new) | POP_TS_RSV2 | ver 2.1 |
| no action | NO_ACTION | ver 2.0 |

POP_TS_INSERT_OTS: The ingress parser 430 may replace the original_timecode field of the corresponding 1588 packet with the timestamp stored in the memory 450. The ingress parser 430 may store timestamp, IP address/Mac address, domain number, and sequence number of a 1588 message by the memory 450. This action may not be performed, when the MAC address from the corresponding 1588 packet matches the MAC address from the memory 450. Similarly, this action may not be performed, when the domain number from the corresponding 1588 packet matches the domain number from the memory 450. This action may not be performed, when the sequence number from the corresponding 1588 packet matches the sequence number from the memory 450. The ingress parser 430 may perform UDP checksum and cyclic redundancy check (CRC) recalculation, since the packet content is modified.

INSERT_RSV2: The ingress parser 430 may insert the ingress sop timestamp of the corresponding 1588 packet into the RESV2 field of the corresponding 1588 packet. The UDP checksum and CRC recalculation may be also performed since the packet content is modified.

PUSH_TS_memory: The ingress parser 430 may store an ingress timestamp of the corresponding 1588 packet into the memory 450. An ingress timestamp may include or indicate a time, at which the ingress parser 430 receives the ingress packet 410. Besides ingress timestamp, the ingress parser 430 may also store IP address/Mac address, domain number, and sequence into the memory 450. The ingress parser 430 may perform UDP checksum and CRC recalculation, if the packet content is modified.

SUB_TS_CF: The ingress parser 430 may perform a correction field update on the corresponding 1588 packet. The new correction field may be the previous correction field in the corresponding 1588 packet—ingress timestamp of the corresponding 1588 packet. The UDP checksum and CRC recalculation may be also performed since the packet content is modified.

INSERT_TS_OTS: The ingress parser 430 may insert the ingress timestamp of the corresponding 1588 packet into the original_timecode field of the corresponding 1588 packet. The ingress parser 430 may perform UDP checksum and CRC recalculation, since the packet content is modified.

POP_TS_RESV2: The ingress parser 430 may replace the reserved field of the corresponding 1588 packet with the timestamp stored in the memory 450. The ingress parser 430 may store, by the memory 450, timestamp, IP address/MAC address, domain number, and sequence number of a 1588 message. This action may not be performed, when the MAC address from the corresponding 1588 packet matches the MAC address from the memory 450. Similarly, this action may not be performed, when the domain number from the corresponding 1588 packet matches the domain number from the memory 450. This action may not be performed, when the sequence number from the corresponding 1588 packet matches the sequence number from the memory 450. The processor 470 may perform UDP checksum and CRC recalculation, since the packet content is modified.

NO_ACTION: The ingress parser 430 has no action on the corresponding 1588 packet.

Egress Action Table

For each egress message type that identified by the packet classifier, various actions can be assigned. Below is a list of actions supported on the ingress side.

TABLE 4

Allowable actions for ingress parser

| Action | RTL Code Parameter | 1588 Version |
|---|---|---|
| pop TS from memory into OTS | POP_INSERT_TS_OTS | ver 2.0 |
| CF = CF + (TXSOP-inband(RXSOP)) | ADD_TS_CF_INBAND | ver 2.0 |
| push TS to memory | PUSH_TS_memory | ver 2.0 |
| CF = CF + TXTS(new) | ADD_TS_CF | ver 2.1 |
| insert TS into OTS | INSERT_TS_OTS | ver 2.0 |
| CF = CF + (memory-inband(RXSOP)) (new) | ADD_TSMEM_CF | ver 2.1 |
| no action | NO_ACTION | |

POP_TS_INSERT_OTS: The egress parser 440 may replace the original_timecode field of the corresponding 1588 packet with the timestamp stored in the memory 450. The egress parser 440 may store, by the memory 450, timestamp, IP address/Mac address, domain number, and sequence number of 1588 messages. This action may not be performed, when the MAC address from the corresponding 1588 packet matches the MAC address from the memory 450. Similarly, this action may not be performed, when the domain number from the corresponding 1588 packet matches the domain number from the memory 450. This action may not be performed, when the sequence number from the corresponding 1588 packet matches the sequence number from the memory 450. The egress parser 440 may perform UDP checksum and CRC recalculation, since the packet content is modified.

ADD_TS_CF_INBAND: The egress parser 440 may perform a correction field update of the corresponding 1588 packet using the timestamp in the reserved field of the corresponding 1588 packet and egress sop timestamp of the corresponding 1588 packet. The new correction field may be the correction field in the corresponding 1588 packet−timestamp in the reserved field+the egress sop timestamp. The egress parser 440 may perform UDP checksum and CRC recalculation, since the packet content is modified.

PUSH_TS_memory: The egress parser 440 may store an egress timestamp of the corresponding 1588 packet into the memory 450. An egress timestamp may include or indicate a time, at which the egress parser 440 receives the egress packet 425. Besides the egress timestamp, the egress parser 440 may also store, by the memory 450, IP address/Mac address, domain number, and sequence. The egress parser 440 may not perform UDP checksum and CRC recalculation, since the packet content is not modified.

ADD_TS_CF: The egress parser 440 may perform a correction field update on the corresponding 1588 packet. The new correction field may be the previous correction field of the corresponding 1588 packet+the egress timestamp of the corresponding 1588 packet. The egress parser 440 may perform the UDP checksum and CRC recalculation, since the packet content is modified.

INSERT_TS_OTS: The egress parser 440 may insert the egress sop timestamp into the original_timecode field of the corresponding 1588 packet. The egress parser 440 may perform the UDP checksum and CRC recalculation, since the packet content is modified.

ADD_TSMEM_CF: The egress parser 440 may perform a correction field update using the timestamp in the reserved field and egress sop timestamp in TSFIFO/memory 450. The new correction field may be the correction field in the corresponding 1588 packet−timestamp in the reserved field+the egress sop timestamp from TSFIFO/memory 450. This action may not be performed, when the MAC address from the corresponding 1588 packet matches the MAC address from the memory 450. Similarly, this action may not be performed, when the domain number from the corresponding 1588 packet matches the domain number from the memory 450. This action may not be performed, when the sequence number from the corresponding 1588 packet matches the sequence number from the memory 450. The egress parser 440 may perform the UDP checksum and CRC recalculation, since the packet content is modified.

NO_ACTION: The parser has no action on the corresponding 1588 packet.

Predefined Ingress/Egress Action Table

In one aspect, the tables 480, 490 can be determined or loaded, according to a role of the device 400. In addition, the table 480, 490 can be determined or loaded, according to a selected operating mode of the device 400. For example, when the device 400 operates as a transparent clock, different actions can be loaded, according to a selected operating mode (e.g., TC with partial TC mode, TC without partial TC mode, peer-2-peer 802.1AS mode TC.) Below is example actions for different operating modes.

TABLE 5

Allowable actions for egress parser of TC for different modes
Egress predefined action table for TC mode

| 1588 message type | TC in Delay request-response mode (no partial TC) | TC in Delay request-response mode (with partial TC) | TC in p2p/802.1AS mode (non-inband/inband) |
|---|---|---|---|
| packedIsSyncOneStep* | ADD_TS_CF | ADD_TS_CF_INBAND | ADD_TS_CF |
| packedIsSyncTwoStep* | PUSH_TS_SOPMEM | PUSH_TS_SOPMEM | PUSH_TS_SOPMEM |
| packetIsDelayRequest* | ADD_TS_CF | ADD_TS_CF_INBAND | N/A |
| packetIsSyncFollowUp | NO_ACTION | NO_ACTION | POP_TS_INSERT_OTS |
| packedIsPdelayRequest | N/A | N/A | PUSH_TS_SOPMEM(T1) |
| packedIsPdelayResposnseOneStep | N/A | N/A | ADD_TS_CF//(CF + (T3-T2)) |
| packedIsPdelayResponseTwoStep | N/A | N/A | PUSH_TS_SOPMEM(T3) |

TABLE 5-continued

Allowable actions for egress parser of TC for different modes
Egress predefined action table for TC mode

| 1588 message type | TC in Delay request-response mode (no partial TC) | TC in Delay request-response mode (with partial TC) | TC in p2p/802.1AS mode (non-inband/inband) |
|---|---|---|---|
| packedIsPdelayResponseFollowUp* | N/A | N/A | NO_ACTION |
| packedIsDelayResponse* | NO_ACTION | NO_ACTION | NO_ACTION |

TABLE 6

Allowable actions for ingress parser of TC for different modes
Ingress predefined action table for TC mode

| 1588 message type | TC in Delay request-response mode (no partial TC) | TC in Delay request-response mode (with partial TC) | TC in P2P/802.1AS mode (none-inband/inband) |
|---|---|---|---|
| packedIsSyncOneStep* | SUB_TS_CF | INSERT_RSV2 | SUB_TS_CF |
| packedIsSyncTwoStep* | PUSH_TS_SOPMEM | PUSH_TS_SOPMEM | PUSH_TS_SOPMEM |
| packetIsDelayRequest* | SUB_TS_CF | INSERT_RSV2 | N/A |
| packetIsSyncFollowUp | NO_ACTION | NO_ACTION | NO_ACTION |
| packedIsPdelayRequest | N/A | N/A | PUSH_TS_SOPMEM/INSERT RSV2(T2) |
| packetIsPdelayResponseOneStep | N/A | N/A | PUSH_TS_SOPMEM/INSERT RSV2(T4) |
| packetIsPdelayResponseTwoStep | N/A | N/A | PUSH_TS_SOPMEM/INSERT_RSV2(T4) |
| packedIsPdelayRespFollowUp* | N/A | N/A | NO_ACTION |
| packetIsDelayResponse* | NO_ACTION | NO_ACTION | NO_ACTION |

When the device 400 is operating as a Grand Master (GM) clock (or master 202), below is the predefined egress and ingress action table. Note, the default setup for GM can support P2P/802.1AS and E2E delay request-response mode at the same time, hence actions may not be distinguished for P2P/802.1AS and E2E delay request-response modes. Also, the action table on the ingress side may depend on whether the device 400 is operating in a non-inband mode or an inband mode. Below is the predefined action table for GM.

TABLE 7

Allowable actions for GM for different modes
Predefined action table for GM

| Packet Format | MC TX | MC RX(non-inband/inband) |
|---|---|---|
| packedIsSyncOneStep | INSERT_TS_OTS(T1) | N/A |
| packedIsSyncTwoStep | PUSH_TS_SOPMEM(T1) | N/A |
| packedIsDelayRequest | N/A | PUSH_TS_SOPMEM/INSERT_RSV2 (T4) |
| packedIsDelayResponse | NO_ACTION | N/A |
| packetIsSyncFollowUp | POP_INSERT_TS_OTS(T1) | N/A |
| packedIsPdelayRequest | PUSH_TS_SOPMEM(T1) | PUSH_TS_SOPMEM/INSERT_RSV2 (T2) |
| packedIsPdelayResponseOneStep | ADD_TS_CF//(CF + (T3 − T2)) | PUSH_TS_SOPMEM/INSERT_RSV2 (T4) |
| packedIsPdelayResponseTwoStep | PUSH_TS_SOPMEM(T3) | PUSH_TS_SOPMEM/INSERT_RSV2 (T4) |
| packedIsPdelayRespFollowUp | NO_ACTION | NO_ACTION |

When the device 400 is operating as a Slave clock (SC) or slave device 204, below is the predefined egress and ingress action table. Note, the default setup for SC can support P2P/802.1AS and E2E delay request-response mode at the same time, hence actions may not be distinguished for P2P/802.1AS and E2E delay request-response modes. Also, the action table on the ingress side may depend on whether the system is operating in a non-inband more or an inband mode.

TABLE 8

Allowable actions for SC for different modes
Predefines action table for SC

| Packet Format | SC RX (non-inband/inband) | SC TX |
|---|---|---|
| packedIsSyncOneStep | PUSH_TS_SOPMEM/INSERT_RSV2(T2) | N/A |
| packedIsSyncTwoStep | PUSH_TS_SOPMEM/INSERT_RSVP(T2) | N/A |
| packetIsDelayRequest | N/A | PUSH_TS_SOPMEM(T3) |
| packetIsDelayResponse | NO_ACTION/POP_TS_INSERT_OTS(T3) | N/A |
| packetIsSyncFollowUp | N/A | N/A |
| packetIsPdelayRequest | PUSH_TS_SOPMEM/INSERT_RSV2(T2) | PUSH_TS_SOPMEM(TI) |
| packetIsPdelayResponseOneStep | PUSH_TS_SOPMEM/INSERT_RSV2(T4) | ADD_TS_CF//(CF + (T3 − T2)) |
| packetIsPdelayResponseTwoStep | PUSH_TS_SOPMEM/INSERT_RSV2(T4) | PUSH_TS_SOPMEM(T3) |
| packetIsPdelayRespFollowUP | NO_ACTION | NO_ACTION |

Follow-Up Assistant Support—in 1588 v 2.1 Using a Predefined Lockup Table

Follow-up assistant happens when the corresponding port is acting two-steps grand master (GM) (or master 202). The related 1588 messages may be sync twostep and follow-up message. Following is an egress action table for GM for the follow-up assistant.

TABLE 9

Allowable actions for GM for different modes
Predefined action table for GM

| Packet Format | MC TX | MX RX(non-inband/inband) |
|---|---|---|
| packedIsSyncOneStep | INSERT_TS_OTS(T1) | N/A |
| packedIsSyncTwoStep | PUSH_TS_SOPMEM(T1) | N/A |
| packetIsDelayRequest | N/A | PUSH_TS_SOPMEM/INSERT_RSV2(T4) |
| packetIsDelayResponse | NO_ACTION | N/A |
| packetIsSyncFollowUp | POP_INSER_TS_OTS(T1) | N/A |

The GM may send a two-step sync message. The egress parser 440 of GM (or master 202) may receive a first egress packet 425, for example, from a host processor or an external processor, and identify that the first egress packet 425 is a two-step sync message, for example, based on the classifier. The egress parser 440 may access the action table 490 and perform the PUSH_TS_memory 450 action. The egress parser 440 may also store the domain number, source MAC address, and sequence ID by the memory 450. The egress parser 440 of GM (or master 202) may transmit the corresponding two-step sync message as a first egress packet 415 without any packet modification to an intermediate node 206 or a slave 204.

The GM may send a follow-up message with the same domain number, source MAC address, and sequence ID. The egress parser 440 may receive a second egress packet 425', and identify the first egress packet as a follow-up message, for example, based on the classifier. The egress parser 440 may access the action table and perform the POP_INSERT_TS_OTS_action. The egress parser 440 may only update the original time field of the follow-up message when there is a match of domain number, source MAC address, and sequence ID. The egress parser 440 may also perform UDP checksum recalculation if the corresponding packet is IPV4 or IPV6 packet. The egress parser 440 may perform CRC recalculation since the packet content is changed. The egress parser 440 may transmit the modified second egress packet 415' to an intermediate node 206 or a slave 204.

With the GM predefined table, the device 400 can be configured to support or operate as both two-step GM and one-step GM. According to the predefined action table, features or operations conforming to the IEEE 1588 2.0 protocol can be performed while conforming to the IEEE 1588 v2.1 protocol.

Support TC in Delay Request Respond Mode (No Partial TC)

The delay request-respond mode may not co-exist with peer-2-peer mode. Therefore, all the peer-2-peer related messages may be noted as not available (N/A). The TC mode in delay request respond mode is to calculate the residence time of the corresponding event message. The related 1588 messages are sync.1step, sync.2step, follow-up, delay_req, and delay_response messages. Below are the related action table for TC mode.

TABLE 10

Allowable egress actions for TC for delay request respond mode (no partial TC)
Egress predefined action table to TC mode

| 1588 message type | TC in Delay request-response mode (no partial TC) | TC in Delay request-response mode (with partial TC) |
|---|---|---|
| packedlsSyncOneStep* | ADD_TS_CF | ADD_TS_CF_INBAND |
| packedlsSyncTwoStep* | PUSH_TS_SOPMEM | PUSH_TS_SOPMEM |
| packetlsDelayRequest* | ADD_TS_CF | ADD_TS_CF_INBAND |
| packetlsSyncFollowUp | NO_ACTION | NO_ACTION |

TABLE 11

Allowable ingress actions for TC for delay request respond mode (no partial TC)
Ingress predefined action table to TC mode

| 1588 message type | TC in Delay request-response mode (no partial TC) | TC in Delay request-response mode (with partial TC) |
|---|---|---|
| packedlsSyncOneStep* | SUB_TS_CF | INSERT_RSV2 |
| packedlsSyncTwoStep* | PUSH_TS_SOPMEM | PUSH_TS_SOPMEM |
| packetlsDelayRequest* | SUB_TS_CF | INSERT_RSV2 |
| packetlsSyncFollowUp | NO_ACTION | NO_ACTION |

Ingress Operation:

When acting as a one-step TC, the related messages sync.1step, delay_req, and delay_response messages. First, the ingress parser 430 of an intermediate node 206 may receive an ingress packet 410 from a master 202 or slave 204. In one example, the ingress parser 430 of an intermediate node 206 may receive a request to synchronize (or SYNC) or a response for a delay measurement request (or DELAY_RESP) from a master 202. In one example, the ingress parser 430 of an intermediate node 206 may receive a request for a delay measurement (or DELAY_REQ) from a slave 204. For any of the event messages (e.g., sync.1step and delay_req messages), the ingress parser 430 may updated a correction field (CF) by performing new CF=old_CF-ingress timestamp based on the ingress action table 480. The ingress parser 430 may also perform UDP checksum recalculation if the corresponding packet is IPV4 or IPV6 packet. The ingress parser 430 may perform CRC recalculation since the packet content is changed. The ingress parser 430 of an intermediate node 206 may transmit a modified ingress packet 420 including the new CF value to a master 202 or slave 204. In one example, the ingress parser 430 of an intermediate node 206 may transmit a request to synchronize (or SYNC) or a response for a delay measurement request (or DELAY_RESP) to a slave 204. In one example, the ingress parser 430 of an intermediate node 206 may transmit a request for a delay measurement (or DELAY_ REQ) to a master 202.

When the device 400 is acting as a two-step TC, the related messages are sync.2step. follow-up, delay_request, and delay_response messages. The ingress parser 430 may perform PUSH_TS_memory, in response to the sync.2step message according to the action table 480. The ingress parser 430 may not perform any action for follow-up messages. The ingress parser 430 may perform CF field update, in response to a delay_req message according to the action table 480.

Egress Operation:

When the device 400 is acting as a one-step TC, the related messages are sync.1step, delay_req, and delay_response messages. First, the egress parser 440 of an intermediate node 206 may receive an egress packet 425 from a master 202 or a slave 204. In one example, the egress parser 440 of an intermediate node 206 may receive a request to synchronize (or SYNC) or a response for a delay measurement request (or DELAY_RESP) from a master 202. In one example, the egress parser 440 of an intermediate node 206 may receive a request for a delay measurement (or DELAY_ REQ) from a slave 204. On the egress side, for any of the event messages (sync.1step message and DelayRequest message), the egress parser 440 may update CF by performing new CF=old_CF+ingress timestamp, based on the egress action table 490. The egress parser 440 may also perform UDP checksum recalculation if the corresponding packet is IPV4 or IPV6 packet. The egress parser 440 may perform CRC recalculation since the packet content is changed. The egress parser 440 of intermediate node 206 may transmit a modified egress packet 415 including the new CF value to a master 202 or slave 204. In one example, the egress parser 440 of an intermediate node 206 may transmit a request to synchronize (or SYNC) or a response for a delay measurement request (or DELAY_RESP) to a slave 204. In one example, the egress parser 440 of an intermediate node 206 may transmit a request for a delay measurement (or DELAY_ REQ) to a master 202.

When the device 400 is acting as a two-step TC, the related messages are sync.2step. follow-up, delay_request, and delay_response messages. The egress parser 440 may perform PUSH_TS_memory 450, in response to the sync.2step message according to the action table 490. The egress parser 440 may not perform any action for follow-up messages. The egress parser 440 may perform CF field update, in response to the delay_req message according to the action table 490.

With these operations, the residence time of the event messages can be calculated per IEEE 1588.

Support TC in Delay Request Respond Mode (with Partial TC)

The delay request-respond mode may not co-exist with peer-2-peer mode. Therefore, all the peer-2-peer related messages may be noted as N/A. The TC mode in delay request respond mode is to calculate the residence time of the corresponding event message. The related 1588 messages may be sync.1step, sync.2step, follow-up, delay_req, and delay_response messages. Below are the related action table for TC mode.

TABLE 12

Allowable egress actions for TC for delay request respond mode (with partial TC)
Egress predefined action table to TC mode

| 1588 message type | TC in Delay request-response mode (no partial TC) | TC in Delay request-response mode (with partial TC) |
| --- | --- | --- |
| packedlsSyncOneStep* | ADD_TS_CF | ADD_TS_CF_INBAND |
| packedlsSyncTwoStep* | PUSH_TS_SOPMEM | PUSH_TS_SOPMEM |
| packetlsDelayRequest* | ADD_TS_CF | ADD_TS_CF_INBAND |
| packetlsSyncFollowUp | NO_ACTION | NO_ACTION |

TABLE 13

Allowable ingress actions for TC for delay request respond mode (with partial TC)
Ingress predefined action table to TC mode

| 1588 message type | TC in Delay request-response mode (no partial TC) | TC in Delay request-response mode (with partial TC) |
| --- | --- | --- |
| packedlsSyncOneStep* | SUB_TS_CF | INSERT_RSV2 |
| packedlsSyncTwoStep* | PUSH_TS_SOPMEM | PUSH_TS_SOPMEM |
| packetlsDelayRequest* | SUB_TS_CF | INSERT_RSV2 |
| packetlsSyncFollowUp | NO_ACTION | NO_ACTION |

Ingress Operation:

When acting as a one-step TC, the related messages sync.1step, delay_req, and delay_response messages. First, the ingress parser 430 of an intermediate node 206 may receive an ingress packet 410 from a master 202 or a slave 204. In one example, the ingress parser 430 of an intermediate node 206 may receive a request to synchronize (or SYNC) or a response for a delay measurement request (or DELAY_RESP) from a master 202. In one example, the ingress parser 430 of an intermediate node 206 may receive a request for a delay measurement (or DELAY_REQ) from a slave 204. For any of the event messages that are used in delay request mode (e.g., sync.1step and delay_req messages), the ingress parser 430 may insert the ingress timestamp into the RESV2 field, based on ingress action table 480. The ingress parser 430 may also perform UDP checksum recalculation if the corresponding packet is IPV4 or IPV6 packet. The ingress parser 430 may perform CRC recalculation since the packet content is changed. The ingress parser 430 of an intermediate node 206 may transmit a modified ingress packet 420 including the new CF value. In one example, the ingress parser 430 of an intermediate node 206 may transmit a request to synchronize (or SYNC) or a response for a delay measurement request (or DELAY_RESP) to a slave 204. In one example, the ingress parser 430 of an intermediate node 206 may transmit a request for a delay measurement (or DELAY_REQ) to a master 202.

When the device 400 is acting as a two-step TC, the related messages are sync.2step. follow-up, delay_request, and delay_response messages. The ingress parser 430 may perform PUSH_TS_memory 450, in response to the sync.2step message according to the action table lookup. The ingress parser 430 may not perform any action for follow-up messages. The ingress parser 430 may perform the same operation, in response to the delay_req message as it is in the one-step clock.

Egression Operation:

When the device 400 is acting as a one-step TC, the related messages are sync.1step, delay_req, and delay_response messages. First, the egress parser 440 of an intermediate node 206 may receive an egress packet 425 from a master 202 or a slave 204. In one example, the egress parser 440 of an intermediate node 206 may receive a request to synchronize (or SYNC) or a response for a delay measurement request (or DELAY_RESP) from a master 202. In one example, the egress parser 440 of an intermediate node 206 may receive a request for a delay measurement (or DELAY_REQ) from a slave 204. For ports that are part of the 1588 network, on the egress side, for any of the event messages that are used in delay request mode (sync.1step message and DelayRequest message), the egress parser 440 may update CF by performing new CF=old_CF−resv2 value+egress timestamp, based on the egress action table 490. Note, the resv2 value is the ingress timestamp previously added by ingress parser 430. The egress parser 440 may also perform UDP checksum recalculation if the corresponding packet is IPV4 or IPV6 packet. The egress parser 440 may perform CRC recalculation since the packet content is changed. The egress parser 440 of intermediate node 206 may transmit a modified egress packet 415 including the new CF value to a master 202 or slave 204. In one example, the egress parser 440 of an intermediate node 206 may transmit a request to synchronize (or SYNC) or a response for a delay measurement request (or DELAY_RESP) to a slave 204. In one example, the egress parser 440 of an intermediate node 206 may transmit a request for a delay measurement (or DELAY_ REQ) to a master 202. For ports that are not participating in the 1588 network, the egress parser 440 may ensure that the corresponding packet is forwarded to those ports that are 1588 disabled.

When the device 400 operates as a two-step TC, for ports that are part of the 1588 network, the related messages are sync.2step. follow-up, delay_request, and delay_response messages. The egress parser 440 may perform PUSH_TS_memory 450, in response to the sync.2step message according to the action table lookup. The egress parser 440 may not perform any action for follow-up messages. The egress parser 440 may perform the same operation, in response to the delay_req message as it is in the one-step clock. For ports that are not participating in the 1588 network, the egress parser 440 may ensure that the corresponding packet is forwarded to those ports that are 1588 disabled.

Support Peer-2-Peer Link Delay Measurement Using Pre-Defined Action Table

Peer-2-peer link delay measurement related messages are Pdelay_req, Pdelay_response.1step, Pdelay_response.2step, and Pdelay_resp_followup. In one aspect, peer-2-peer link delay measurement may occur in a peer-2-peer mode, and not in a delay request-response mode. Hence, the action for the entire peer-2-peer related messages may be N/A in the TC action table for the delay request-response mode. For GM and SC, the action for the entire peer-2-peer related messages may be meaningful when the device 400 is operating in a peer-2-peer mode.

Peer-2-peer link measurement may be performed between link partners (e.g., a nodeA or a delay_requester, and a nodeB or a delay_responder). In one aspect, a device can operate as the delay requester, the delay responder, or both. Below is the action table for peer-2-peer related messages.

some embodiments, the process 600 is performed by a nodeA 606, and a nodeB 604. The nodeA 606 and the nodeB 604 may be any network node (e.g., the master 202, intermediate node 206 or the slave 204). In some embodiments, the process 600 is performed by other entities. In some embodiments, the process 600 includes more, fewer, or different steps than shown in FIG. 6.

In one approach, at time T1, the nodeA 606 transmits a Pdelay_req message or packet. A Pdelay_req message may be a message including a request to perform or initiate a delay measurement. For example, the egress parser 440A of the nodeA 606 may generate and transmit a Pdelay_req message at time T1. The egress parser 440A of the nodeA 606 may store the time T1 by TSFIFO or the memory 450A of the nodeA 606, in response to a PUSH_TS_memory command (e.g., user defined command) according to the table 490A. The processor 470A may retrieve T1 via MDIO.

In one approach, at time T2, the nodeB 604 receives the Pdelay_req message or packet. For example, the ingress parser 430B of the nodeB 604 receives the Pdelay_req message at time T2. In a non-inband mode, the ingress parser 430B may store the timestamp value T2 by TSFIFO or the memory 450B of the nodeB 604, in response to the Pdelay_req message according to the table 480B of the nodeB 604. There may be no packet content modification when it is in none-inband mode. In the inband mode, the ingress parser 430B may insert the timestamp value T2 to the reserved field, in response to the INSERT_RESV2 message (e.g., user defined command) according to the table 480B of the nodeB 604. In the inband mode, CRC recalculation and UDP checksum recalculation may be performed, since the packet content is modified.

In one approach, at time T3, the nodeB 604 transmits a Pdelay_Resp.2step message or packet, in response to the Pdelay_req message or packet. A Pdelay_Resp.2step message may be a response message responding to the Pdelay_req message. The Pdelay_Resp.2step message may include the timestamp value T2. For example, the egress parser 440B of the nodeB 604 generates and transmits the Pdelay_Resp.2step message at time T3. The egress parser 440B may store the timestamp value T3 by a TSFIFO or memory 450B of the nodeB, in response to generating the

TABLE 14

Allowable actions for P2P link measurement

| Packet Format | SC RX (non-inband/inband) | SC TX |
|---|---|---|
| packetIsPdelayRequest | PUSH_TS_SOPMEM/INSERT_RSV2 (T2) | PUSH_TS_SOPMEM(T1) |
| packetIsPdelayResponseOneStep | PUSH_TS_SOPMEM/INSERT_RSV2 (T4) | ADD_TS_CF//(CF + (T3 −T2)) |
| packetIsPdelayResponseTwoStep | PUSH_TS_SOPMEM/INSERT_RSV2 (T4) | PUSH_TS_SOPMEM(T3) |
| packetIsPdelayRespFollowUp | NO_ACTION | NO_ACTION |

On the ingress side, the action table may be also based on inband or non-inband control. For non inband mode, the timestamp of the ingress packet 410 is capture and write to the TSFIFO/memory. For the non inband mode, the processor 470 would retrieve the ingress timestamp via MDIO. For an inband mode, the ingress timestamp may be inserted into the reserved field, so that the processor 470 can retrieve the ingress timestamp along with the ingress packet 410 without MDIO access.

Figure 6:
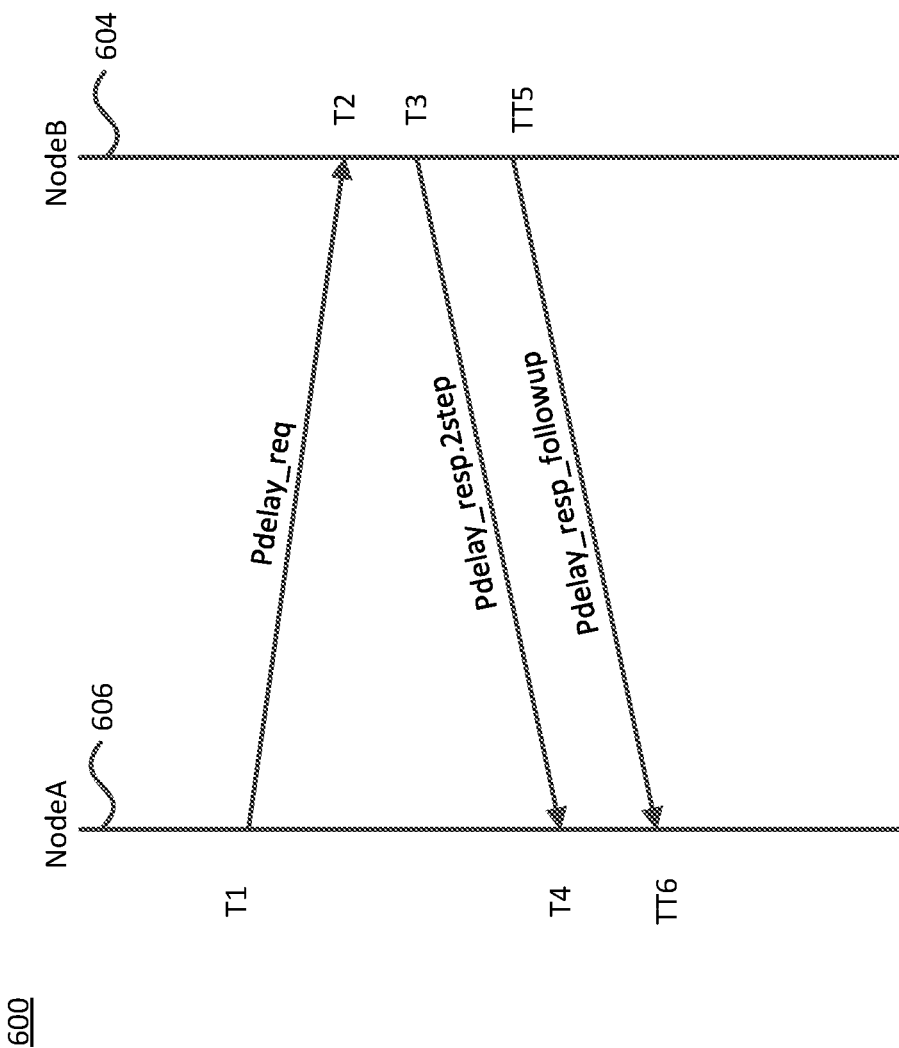
FIG. 6 illustrates an interaction diagram showing a process of performing two-step peer to peer link delay measurement based on a look up table, in accordance with an embodiment.

FIG. 6 illustrates an interaction diagram showing a process 600 of performing two-step peer to peer link delay measurement based on a look up table, in accordance with an embodiment. In one aspect, two-step peer to peer link delay measurement is performed under 802.1AS mode. In Pdelay_req according to the action table 490B of the nodeB 604. The processor 470B of the nodeB 604 may retrieve the timestamp values T3 and T2 via MDIO.

In one approach, at time T4, the nodeA 606 receives Pdelay_resp message, in response to the Pdelay_req on the RX side. The ingress parser 430A of the nodeA 606 may receive the Pdelay_resp message at time T4. In the non-inband mode, the ingress parser 430A may store the timestamp value T4 by TSFIFO or the memory 450A of the nodeA 606, in response to PUSH_TS_memory 450 (e.g., user defined command) according to the table 480A. The processor 470A of the nodeA 606 may retrieve time timestamp value T4 through MDIO access. In the inband-mode, the ingress parser 430A may insert the timestamp value T4 to the reserved field, in response to the INSERT_RESV2 (e.g., user defined command) message according to the table 480A of the nodeA 606. The processor 470A may retrieve the timestamp value T4 along with the packet.

In one approach, at time TT5, the nodeB 604 transmits a Pdelay_Resp.2step message or packet, in response to the Pdelavy_req message or packet. A Pdelay_resp_followup message may be a follow up message provided after the Pdelay_resp.2step message. The Pdealy_resp_followup message may include timestamp value T3. The time TT5 may be before the time T4 or after the time T4. In one example, the egress parser 440B of the nodeB 604 generates and transmits the Pdelay_response_followup message at time TT5, which may be a predetermined time after the time T3.

In one approach, at time TT6, the nodeA 606 receives Pdelay_resp message, in response to the Pdelay_req on the RX side. The ingress parser 430A of the nodeA 606 may receive the Pdelay_resp message at time TT6. In the non-inband mode, the ingress parser 430A may store the timestamp value T4 by TSFIFO or the memory 450 of the nodeA 606, in response to PUSH_TS_memory 450 according to the table 480A. The processor 470A of the nodeA 606 may retrieve time timestamp value T4 through MDIO access. In the inband-mode, the ingress parser 430A may insert the timestamp value T4 to the reserved field, in response to the INSERT_RESV2 message according to the table 480A of the nodeA 606. Based on the timestamp value T4 and the timestamp value T3, the processor 470A may determine or measure delay in a peer to peer link between the nodeA 606 and the nodeB 604 for ingress path. The egress path delay may be determined by a difference between the timestamp value T1 and timestamp value T2 between nodeA 606 and the nodeB 604.

Figure 7:
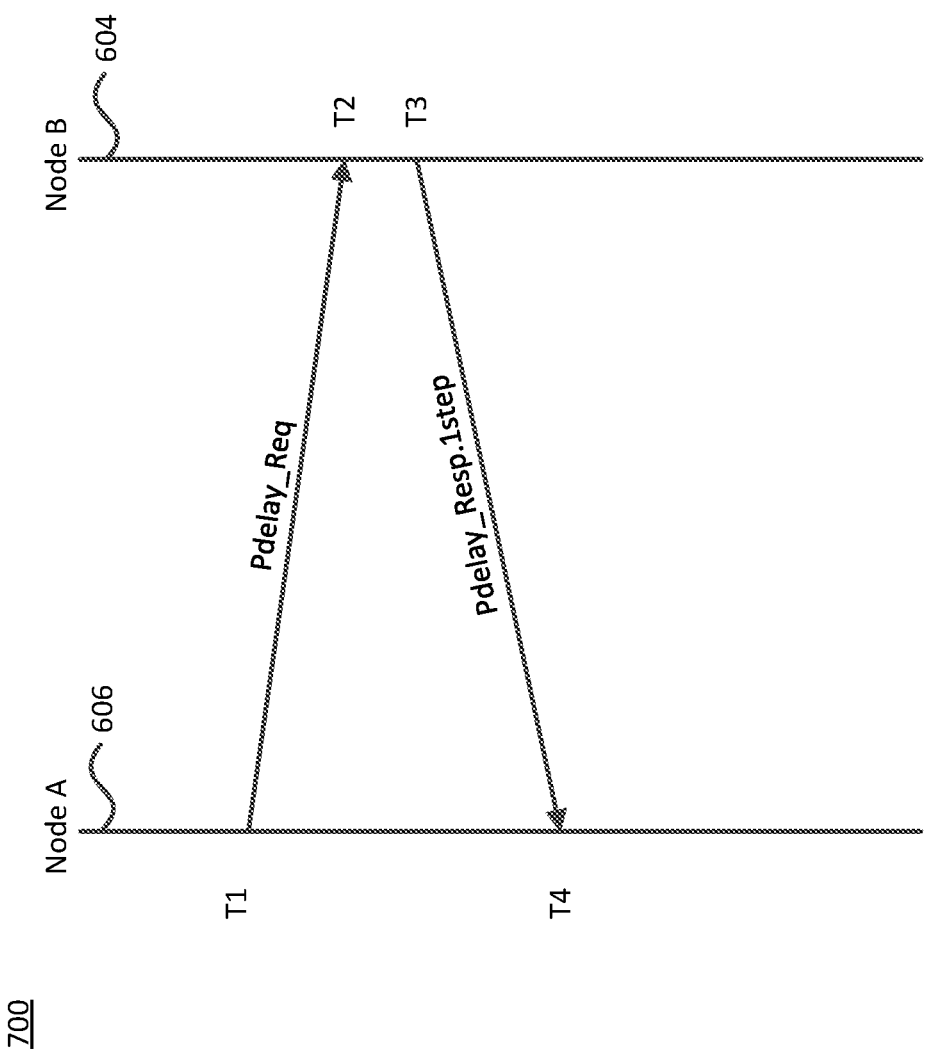
FIG. 7 illustrates an interaction diagram showing a process of performing one-step peer to peer link delay measurement based on a look up table, in accordance with an embodiment.

FIG. 7 illustrates an interaction diagram showing a process 700 of performing one-step peer to peer link delay measurement based on a look up table, in accordance with an embodiment. In one aspect, one-step peer to peer link delay measurement is performed under 802.1AS mode. In some embodiments, the process 700 is performed by the nodeA 606, and the nodeB 604. In some embodiments, the process 700 is performed by other entities. In some embodiments, the process 700 includes more, fewer, or different steps than shown in FIG. 7.

In one aspect, the process 700 is similar to the process 600, except the nodeB 604 transmits Pdelay_resp.1step message or packet instead of Pdelay_resp.2step message or packet, and the nodeB 604 does not transmit the Pdelay_resp_followup message or packet. Thus, detailed description of duplicated portion thereof is omitted herein for the sake of brevity.

In one aspect, the nodeB 604 generates the Pdelay_resp.1step message or packet using time T2. For example, the egress parser 440B of the nodeB 604 inserts a negative of the timestamp value T2 (or −T2) in the CF field of the corresponding Pdelay_resp.1step message, in response to the Pdelay_req message. The egress parser 440B may update the CF using the egress timestamp value T3, in response to an instruction ADD_TS_CF (e.g., user defined command) according to the action table 490B. The egress parser 440B may transmit the Pdelay_resp.1step message including the updated CF. Based on the updated CF, the nodeA 606 may determine or measure delay in a peer to peer link between the nodeA 606 and the nodeB 604.

User-Defined Ingress and Egress Action Table

In some embodiments, a list of one or more actions in the tables 480, 490 can be edited or modified by a user of the device 400. For example, the processor 470 may present a user interface allowing the user to add or remove one or more actions to perform. By allowing the user to add or modify one or more actions listed in the tables 480, 490, the device 400 may perform or support certain operations that were not feasible, or perform or support certain operations in an efficient manner. For example, user defined actions may support two-step TC with a follow-up assistant.

Support Two-Step TC with Follow-Up Assistant Using User-Defined Action Table

Users can set up the egress action table and the ingress action table as below to support two-step TC with a follow-up assistant. In addition, with the flexible user-defined table below, one-step and two-step TC can be supported at the same time.

Follow-up messages may exist in a delay request-respond mode. Since delay request-response mode may not co-exist with peer-2-peer mode, the action of all the peer-2-peer related messages may be noted as N/A.

TABLE 15

User-defined actions for two-step TC
Action table for 2-step/1step E2E TC with follow-up assistant

| Packet Format | port (egress) | port(ingress) |
|---|---|---|
| packedIsSyncOneStep | ADD_TS_CF_INBAND | INSERT_RSV2 |
| packedIsSyncTwo Step | PUSH_TS_SOPMEM | PUSH_TS_SOPMEM |
| packetIsDelayRequest | ADD_TS_CF_INBAND | INSER_RSV2 |
| packetIsDelayResponse | NO_ACTION | NO_ACTION |
| packetIsSyncFollowUp | ADD_TSMEM_CF | POP_TS_RESV2 |
| packetIsPdelayRequest | N/A | N/A |
| packetIsPdelayResponseOneStep | N/A | N/A |
| packetIsPdelayResponseTwoStep | N/A | N/A |
| packetIsPdelayRespFollowUp | N/A | N/A |

In one approach, an ingress parser 430 of a first port (e.g., port 0) receives a sync message or packet from a master 202. In response to the sync message applied to the table 480, the ingress parser 430 may perform the PUSH_TS_memory 450 action. The ingress parser 430 may store the ingress timestamp of the sync message by the memory 450. The ingress parser 430 may also store IP address/MAC address, domain number, and sequence number by the memory 450. No packet content may be modified. The ingress parser 430 may forward the sync message to an egress parser 440 of a second port (e.g., port 1) based on the switch lookup result.

In response to the sync message applied to the table 490, the egress parser 440 may perform the PUSH_TS_memory 450 action. The egress timestamp (sync_egsop) of this sync message may be stored by the memory 450. The egress parser 440 may also store IP address/MAC address, domain number, and sequence number by memory 450. No packet content is modified here.

The ingress parser 430 may receive a follow-up message. In response to the follow-up message applied to the table 480, the ingress parser 430 may perform the POP_TS_RESV2 action. Sync_igsop will be at the reserved field of the corresponding follow-up message (F_U_1). Since the packet content is modified, the ingress parser 430 may also perform UDP checksum recalculation and CRC recalculation. This new follow-up message (F_U_2) may be forwarded to the processor 470 based on the switch lookup result. The processor 470 may send a follow-up message (F_U_2) back to switch.

The egress parser 440 of the second port (PT1) may receive the follow-up message. In response to the follow-up message applied to the table 490, the egress parser 440 may perform the ADD_TSMEM_CF action. The egress parser 440 may pop the sync_egsop out from memory 450 of PT1. The egress parser 440 may optionally perform do ADD_TS_MEM_CF based on the comparison result of IP address/MAC address, Domain number, and Sequence number. The egress parser 440 may replace the correction field of F_U_2 with the new correction field. The new correction field may be equal to the old correction field of F_U_2+Sync_egsop–Sync_igsop. Sync_igsop can be found in the reserved field of F_U_2. With this, the residence time can be correctly calculated. Moreover, the egress parser 440 of PT1 may also perform UDP checksum recalculation and CRC recalculation.

In one aspect, the user-defined look up table can support two step TC with follow up assistant in an efficient manner. For example, the processor 470 may not perform MDIO access on every sync message to retrieve the ingress timestamp and egress timestamp. Also, processor 470 may not perform UDP checksum recalculation and CRC recalculation. Accordingly, the CPU load can be reduced to achieve computational efficiency, and the operating speed can be improved.

With the user-defined action table, 1-step TC can be also supported. For example, the ingress parser 430 may insert sync_igsop in the reserved field. The egress parser 440 may perform ADD_TS_CF_INBAND action, based on the egress action table. With this, the residence time of one-step sync message can be calculated correctly and updated in the CF field of the corresponding one-step sync message.

Various embodiments disclosed herein are related to a method of supporting time synchronization. In some embodiments, the method includes determining, by a processor of a device, a role of the device. In some embodiments, the method includes determining, by the processor, a table including a list of one or more actions associated with the determined role of the device. In some embodiments, the method includes receiving, by a communication interface of a device, a packet for communication. In some embodiments, the method includes determining, by the communication interface, from the one or more actions associated with the determined role of the device in the table, an action corresponding to a portion of the packet. In some embodiments, the method includes performing, by the communication interface, the action for communication.

In some embodiments, the method includes determining, by the communication interface, a type of the packet. In some embodiments, the table is determined according to the determined type of the packet.

In some embodiments, the packet is an ingress packet, and the communication interface is an ingress parser. In some embodiments, the method includes applying, by the ingress parser, the portion of the ingress packet to the table to determine the action.

In some embodiments, the list includes two or more actions of: replacing, by the ingress parser, a first timestamp value of an original timecode field in the ingress packet with a stored timestamp value stored by a memory of the device; storing, by the memory of the device, a second timestamp value of an ingress timestamp of the ingress packet; and inserting, by the ingress parser, a third timestamp value of the ingress timestamp into the original timecode field in the ingress packet.

In some embodiments, the list includes two or more actions of: inserting, by the ingress parser, the third timestamp value of the ingress timestamp into a reserved field in the ingress packet; updating, by the ingress parser, a correction field in the ingress packet based on the second timestamp value of the ingress timestamp; and replacing, by the ingress parser, a fourth timestamp value of the reserved field in the ingress packet with the stored timestamp.

In some embodiments, the packet is an egress packet, and the communication interface is an egress parser. In some embodiments, the method includes applying, by the egress parser, the portion of the egress packet to the table to determine the action.

In some embodiments, the list includes two or more actions of: replacing, by the egress parser, a first timestamp value of an original timecode field in the egress packet with a stored timestamp value stored by a memory of the device; updating, by the egress parser, a correction field of the egress packet based on a second timestamp value of a reserved field in the egress packet and a third timestamp value of an egress timestamp of the egress packet; storing, by the memory of the device, a fourth timestamp value of the egress timestamp of the egress packet; and inserting, by the egress parser, the third timestamp value of the egress timestamp into the original timecode field in the egress packet.

In some embodiments, the list includes two or more actions of: updating, by the egress parser, the correction field of the egress packet based on the fourth timestamp value of the egress timestamp; and performing, by the egress parser, a correction field update based on the second timestamp value of the reserved field and a fifth timestamp value of the egress timestamp in a FIFO or the memory of the device.

In some embodiments, the packet is an egress packet, and the communication interface is an egress parser. In some embodiments, the action for communication is storing, by a memory of the device, a timestamp value of an egress timestamp of the egress packet. In some embodiments, the method further includes: storing, by the memory of the device, a domain number, source MAC address, and sequence ID; receiving, by the egress parser, a subsequent packet; and replacing, by the egress parser, a first timestamp value of an original timecode field in the egress packet with a stored timestamp value stored by the memory of the device, in response to the subsequent packet having the stored a domain number, source MAC address, or sequence ID.

In some embodiments, the action for communication includes updating, by the communication interface, one or more fields in the packet, and performing, by the communication interface, a CRC recalculation on the updated packet.

In some embodiments, the communication interface includes an ingress parser and an egress parser. In some embodiments, performing, by the communication interface, the action for communication includes: transmitting, by the egress parser to another device, a delay measurement request at a first time, based on one or more actions in the table, and receiving, by the ingress parser from the another device in response to the delay measurement request, a delay response message at a second time, based on one or more actions in the table.

In some embodiments, performing, by the communication interface, the action for communication includes receiving, by the ingress parser in response to the delay measurement request, another delay response message at a third time after the second time, based on one or more actions in the table.

In some embodiments, the communication interface includes an ingress parser and an egress parser. In some embodiments, performing, by the communication interface, the action for communication includes: receiving, by the ingress parser from another device, a delay measurement request at a first time, based on one or more actions in the table; and transmitting, by the egress parser to the another device in response to the delay measurement request, a delay response message at a second time, based on one or more actions in the table.

In some embodiments, performing, by the communication interface, the action for communication includes transmitting, by the egress parser to the another device, in response to the delay measurement request, another delay response message at a third time after the second time based on one or more actions in the table.

In some embodiments, the method further includes receiving, by the communication interface, an instruction to update the table, and updating, by the communication interface, the table according to the instruction.

In some embodiments, the packet is an IEEE 1588 packet, wherein the portion of the packet is a reserved field in the IEEE 1588 packet.

Various embodiments disclosed herein are related to a device for supporting time synchronization. In some embodiments, the device includes a processor configured to determine a role of a device, and determine a table including a list of one or more actions associated with the determined role of the device. In some embodiments, the device includes a communication interface configured to: receive a packet for communication, determine, from the one or more actions associated with the determined role of the device in the table, an action corresponding to a portion of the packet, and perform the action for communication.

In some embodiments, the packet is an IEEE 1588 packet, wherein the portion of the packet is a reserved field in the IEEE 1588 packet.

Various embodiments disclosed herein are related to a non-transitory computer readable medium storing instructions when executed by one or more processors cause the one or more processors to: determine a role of a device, determine a table including a list of one or more actions associated with the determined role of the device, cause a communication interface to receive a packet for communication, cause the communication interface to determine, from the one or more actions associated with the determined role of the device in the table, an action corresponding to a portion of the packet, and cause the communication interface to perform the action for communication.

In some embodiments, the packet is an IEEE 1588 packet, wherein the portion of the packet is a reserved field in the IEEE 1588 packet.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a stand-alone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method comprising:
    determining, by a processor of a device, a role of the device, the role comprising one of a master, slave or intermediary;
    determining, by the processor, a table including a list of one or more actions associated with the determined role of the device;
    receiving, by a communication interface of the device, a packet for communication;
    determining, by the communication interface using one or more bits in a field of the packet, an action from the one or more actions associated with the determined role of the device in the table, the action corresponding to modifying a timestamp value in a portion of the packet; and
    performing, by the communication interface, the action on the packet for communication of the packet.

2. The method of claim 1, further comprising:
    determining, by the communication interface, a type of the packet, wherein the table is determined according to the determined type of the packet.

3. The method of claim 1, wherein the packet is an ingress packet, wherein the communication interface is an ingress parser, the method further comprising: applying, by the ingress parser, the portion of the ingress packet to the table to determine the action.

4. The method of claim 3, wherein the list includes two or more actions of:
    replacing, by the ingress parser, a first timestamp value of an original timecode field in the ingress packet with a stored timestamp value stored by a memory of the device;
    storing, by the memory of the device, a second timestamp value of an ingress timestamp of the ingress packet; and inserting, by the ingress parser, a third timestamp value of the ingress timestamp into the original timecode field in the ingress packet.

5. The method of claim 4, wherein the list includes two or more actions of:
inserting, by the ingress parser, the third timestamp value of the ingress timestamp into a reserved field in the ingress packet;
updating, by the ingress parser, a correction field in the ingress packet based on the second timestamp value of the ingress timestamp; and
replacing, by the ingress parser, a fourth timestamp value of the reserved field in the ingress packet with the stored timestamp.

6. The method of claim 1, wherein the packet is an egress packet, wherein the communication interface is an egress parser, the method further comprising:
applying, by the egress parser, the portion of the egress packet to the table to determine the action.

7. The method of claim 6, wherein the list includes two or more actions of:
replacing, by the egress parser, a first timestamp value of an original timecode field in the egress packet with a stored timestamp value stored by a memory of the device;
updating, by the egress parser, a correction field of the egress packet based on a second timestamp value of a reserved field in the egress packet and a third timestamp value of an egress timestamp of the egress packet;
storing, by the memory of the device, a fourth timestamp value of the egress timestamp of the egress packet; and
inserting, by the egress parser, the third timestamp value of the egress timestamp into the original timecode field in the egress packet.

8. The method of claim 7, wherein the list includes two or more actions of:
updating, by the egress parser, the correction field of the egress packet based on the fourth timestamp value of the egress timestamp; and
performing, by the egress parser, a correction field update based on the second timestamp value of the reserved field and a fifth timestamp value of the egress timestamp in a FIFO or the memory of the device.

9. The method of claim 1, wherein the packet is an egress packet, wherein the communication interface is an egress parser, wherein the action for communication is storing, by a memory of the device, a timestamp value of an egress timestamp of the egress packet, the method further comprising:
storing, by the memory of the device, a domain number, source MAC address, and sequence ID;
receiving, by the egress parser, a subsequent packet; and
replacing, by the egress parser, a first timestamp value of an original timecode field in the egress packet with a stored timestamp value stored by the memory of the device, in response to the subsequent packet having the stored a domain number, source MAC address, or sequence ID.

10. The method of claim 1, wherein the action for communication includes:
updating, by the communication interface, one or more fields in the packet, and
performing, by the communication interface, a cyclic redundancy check (CRC) recalculation on the updated packet.

11. The method of claim 1, wherein the communication interface includes an ingress parser and an egress parser, wherein performing, by the communication interface, the action for communication includes:
transmitting, by the egress parser to another device, a delay measurement request at a first time, based on one or more actions in the table; and
receiving, by the ingress parser from the another device in response to the delay measurement request, a delay response message at a second time, based on one or more actions in the table.

12. The method of claim 11, wherein performing, by the communication interface, the action for communication includes:
receiving, by the ingress parser in response to the delay measurement request, another delay response message at a third time after the second time, based on one or more actions in the table.

13. The method of claim 1, wherein the communication interface includes an ingress parser and an egress parser, wherein performing, by the communication interface, the action for communication includes:
receiving, by the ingress parser from another device, a delay measurement request at a first time, based on one or more actions in the table, and
transmitting, by the egress parser to the another device in response to the delay measurement request, a delay response message at a second time, based on one or more actions in the table.

14. The method of claim 13, wherein performing, by the communication interface, the action for communication includes:
transmitting, by the egress parser to the another device, in response to the delay measurement request, another delay response message at a third time after the second time based on one or more actions in the table.

15. The method of claim 1, further comprising:
receiving, by the communication interface, an instruction to update the table; and
updating, by the communication interface, the table according to the instruction.

16. The method of claim 1, wherein the packet is an Institute of Electrical and Electronics Engineers (IEEE) 1588 packet, wherein the portion of the packet is a reserved field in the IEEE 1588 packet.

17. A device comprising:
a processor configured to:
determine a role of the device, the role comprising one of a master, slave or intermediary, and
determine a table including a list of one or more actions associated with the determined role of the device; and
a communication interface configured to:
receive a packet for communication,
determine, using one or more bits in a field of the packet, an action from the one or more actions associated with the determined role of the device in the table, the action corresponding to modifying a timestamp value in a portion of the packet, and perform the action for communication.

18. The device of claim 17, wherein the packet is an Institute of Electrical and Electronics Engineers (IEEE) 1588 packet, wherein the portion of the packet is a reserved field in the IEEE 1588 packet.

19. A non-transitory computer readable medium storing instructions when executed by one or more processors cause the one or more processors to:

determine a role of a device, the role comprising one of a master, slave or intermediary;

determine a table including a list of one or more actions associated with the determined role of the device;

cause a communication interface to receive a packet for communication;

cause the communication interface to determine, using one or more bits in a field of the packet, an action from the one or more actions associated with the determined role of the device in the table, the action corresponding to modifying a timestamp value in a portion of the packet; and cause the communication interface to perform the action on the packet for communication of the packet.

20. The non-transitory computer readable medium of claim 19, wherein the packet is an Institute of Electrical and Electronics Engineers (IEEE) 1588 packet, wherein the portion of the packet is a reserved field in the IEEE 1588 packet.

* * * * *